US012628732B2

(12) United States Patent
Maggard et al.

(10) Patent No.: US 12,628,732 B2
(45) Date of Patent: May 19, 2026

(54) MAINTENANCE APPARATUS WITH CONDITIONAL MOTOR DRIVE FOR CASTER WHEELS

(71) Applicant: MTD PRODUCTS INC, Valley City, OH (US)

(72) Inventors: Jay Maggard, Polk, OH (US); Zachary A. Lyzen, Seattle, WA (US)

(73) Assignee: MTD Products Inc, Valley City, OH (US)

( * ) Notice: Subject to any disclaimer, the term of this patent is extended or adjusted under 35 U.S.C. 154(b) by 581 days.

(21) Appl. No.: 18/106,311

(22) Filed: Feb. 6, 2023

(65) Prior Publication Data

US 2023/0249745 A1 Aug. 10, 2023

Related U.S. Application Data

(60) Provisional application No. 63/306,717, filed on Feb. 4, 2022.

(51) Int. Cl.
| | |
|---|---|
| *A01D 34/64* | (2006.01) |
| *A01D 34/00* | (2006.01) |
| *A01D 101/00* | (2006.01) |

(52) U.S. Cl.
CPC ............ *A01D 34/64* (2013.01); *A01D 34/006* (2013.01); *A01D 2101/00* (2013.01)

(58) Field of Classification Search
CPC ...... B62D 11/04; B62D 7/023; B62D 5/0418; A01D 34/64; A01D 34/006; A01D 2101/00; A01D 34/00; A01D 34/001; A01D 34/008; A01D 34/82
See application file for complete search history.

(56) References Cited

U.S. PATENT DOCUMENTS

| | | | |
|---|---|---|---|
| 1,050,501 | A | 1/1913 | Walter |
| 6,808,032 | B2 | 10/2004 | Wuertz et al. |
| 7,686,107 | B1 | 3/2010 | Bland et al. |
| 7,918,304 | B2 | 4/2011 | Perry et al. |
| 8,011,678 | B1 | 9/2011 | Bell et al. |
| 8,152,183 | B1 | 4/2012 | Bell et al. |
| 8,191,342 | B2 | 6/2012 | Ishii et al. |
| 8,262,109 | B1 | 9/2012 | Bell et al. |
| 8,267,205 | B2 | 9/2012 | Ishii et al. |
| 8,469,402 | B2 | 6/2013 | Minoura et al. |
| 8,496,256 | B2 | 7/2013 | Bebernes et al. |
| 8,528,685 | B2 | 9/2013 | Scherbring et al. |
| 8,838,311 | B2 | 9/2014 | Koike et al. |

(Continued)

*Primary Examiner* — Brad Harcourt
(74) *Attorney, Agent, or Firm* — Wegman Hessler

(57) ABSTRACT

Selectively powered caster wheels for a maintenance apparatus are described. A motor attached to the caster wheel(s) can be selectively powered to apply force to the caster wheel. This force can be selected to overcome another force sensed at the maintenance apparatus, or to steer the maintenance apparatus on a desired course or direction. The caster wheels can be configured to orient along a direction of motion of the maintenance apparatus, in response to power from the motor or in response to the motion of the maintenance apparatus itself. In further embodiments, the motor(s) can be selectively activated or deactivated by an operator of the maintenance apparatus, in response to a remote control signal, or in response to an onboard or offboard controller of the apparatus.

37 Claims, 15 Drawing Sheets

EXAMPLE CASTER WHEEL WITH MOTOR DRIVE
800

MOTOR CONTROL
710

722 SELECTIVE DRIVE AXIS

720
SELECTIVE DRIVE MOTOR

(56)         References Cited

U.S. PATENT DOCUMENTS

| | | | |
|---|---|---|---|
| 8,844,658 B2 | 9/2014 | Wyatt et al. | |
| 8,925,672 B2 | 1/2015 | Bebernes et al. | |
| 8,950,520 B2 | 2/2015 | Hauser | |
| 9,439,341 B2 | 9/2016 | Bebernes | |
| 9,499,199 B1 * | 11/2016 | Laymon | B62D 11/003 |
| 9,656,687 B2 | 5/2017 | Koike et al. | |
| 9,725,114 B1 | 8/2017 | Brown et al. | |
| 9,725,115 B1 | 8/2017 | Hauser et al. | |
| 9,854,736 B2 | 1/2018 | Fox et al. | |
| 9,930,824 B2 | 4/2018 | Nafziger et al. | |
| 9,932,070 B2 | 4/2018 | Walden | |
| 10,035,537 B2 | 7/2018 | Hauser et al. | |
| 10,207,735 B2 | 2/2019 | Bebernes et al. | |
| 10,251,344 B2 | 4/2019 | Fay, II et al. | |
| 10,293,853 B2 | 5/2019 | Koike et al. | |
| 10,386,884 B1 | 8/2019 | Brown et al. | |
| 10,435,069 B1 | 10/2019 | Hauser et al. | |
| 10,759,476 B2 | 9/2020 | Zimmerman et al. | |
| 10,766,526 B2 | 9/2020 | Bebernes et al. | |
| 10,822,021 B2 | 11/2020 | Hauser et al. | |
| 10,829,150 B1 | 11/2020 | Hauser et al. | |
| 10,836,426 B1 | 11/2020 | Busboom et al. | |
| 10,850,723 B2 | 12/2020 | Dockter et al. | |
| 11,026,368 B2 | 6/2021 | Fay, II et al. | |
| 11,046,362 B1 | 6/2021 | Snider, Jr. | |
| 11,097,775 B2 | 8/2021 | Fay, II | |
| 11,129,331 B2 | 9/2021 | Young et al. | |
| 11,166,403 B2 | 11/2021 | Dockter et al. | |
| 11,186,469 B2 | 11/2021 | Goncalves et al. | |
| 11,230,319 B1 | 1/2022 | Brown et al. | |
| 2003/0019682 A1 | 1/2003 | Schaedler et al. | |
| 2006/0175098 A1 | 8/2006 | Sutherland | |
| 2008/0264026 A1 | 10/2008 | Ishii et al. | |
| 2010/0206647 A1 | 8/2010 | Ishii et al. | |
| 2011/0147108 A1 | 6/2011 | Hecht, Sr. et al. | |
| 2012/0023886 A1 | 2/2012 | Minoura | |
| 2012/0159916 A1 * | 6/2012 | Ishii | B60L 58/40 |
| | | | 56/10.2 G |
| 2012/0247077 A1 | 10/2012 | Tada et al. | |
| 2012/0323420 A1 | 12/2012 | Koike et al. | |
| 2014/0138165 A1 | 5/2014 | Bebernes et al. | |
| 2014/0138167 A1 | 5/2014 | Bebernes et al. | |
| 2014/0371991 A1 | 12/2014 | Buchanan | |
| 2015/0039171 A1 | 2/2015 | Koike et al. | |
| 2015/0151781 A1 | 6/2015 | Hauser et al. | |
| 2015/0223386 A1 | 8/2015 | Nafziger et al. | |
| 2017/0217488 A1 | 8/2017 | Koike et al. | |
| 2020/0164917 A1 | 5/2020 | Fay, II | |

* cited by examiner

CONTROLS 105

EXAMPLE MAINTENANCE APPARATUS 100

FRONT CASTER WHEELS 110

CASTER SWIVEL AXIS 118

CASTER ARM 116

SPIN AXIS 114

WHEEL 112

OPTIONAL SENSOR AT PTO CLUTCH / PTO ANTI-ROTATION PIN 130

REAR WHEELS 120

EXAMPLE LAWN MAINTENANCE DEVICE
200

220
REAR WHEEL

230
OPTIONAL SENSOR AT PTO CLUTCH /
PTO ANTI-ROTATION PIN

210
FRONT CASTER WHEELS

EXAMPLE LAWN MAINTENANCE DEVICE
300

FRONT CASTER WHEELS
310

REAR WHEEL
330

DRIVE WHEEL
320

OPTIONAL SENSOR AT PTO CLUTCH /
PTO ANTI-ROTATION PIN
330

EXAMPLE CASTER WHEEL FRAME AND AXIS
400

‑‑‑‑418 CASTER SWIVEL AXIS

426

430

414
SPIN AXIS

EXAMPLE CASTER WHEEL WITH
CASTER ARM AND CASTER TRAIL
500

SWIVEL MOUNT
526

CASTER ARM
116

520 FRAME

112 WHEEL

CASTER SWIVEL AXIS 118

114 SPIN AXIS

510
CASTER TRAIL

EXAMPLE CASTER WHEEL MOTOR DRIVE
600

620
SELECTIVE DRIVE
MOTOR & AXIS

CASTER WHEEL 500

618
SELECTIVE SWIVEL/
DRIVE AXIS

114 SPIN AXIS

510
CASTER TRAIL

EXAMPLE CASTER WHEEL WITH MOTOR DRIVE
700

SELECTIVE
DRIVE MOTOR
720

MOTOR CONTROL 710

722
SELECTIVE
DRIVE AXIS

500
CASTER
WHEEL

116
CASTER SWIVEL AXIS

EXAMPLE CASTER WHEEL WITH MOTOR DRIVE
800

MOTOR CONTROL
710

722  SELECTIVE
DRIVE AXIS

720
SELECTIVE
DRIVE MOTOR

930 OPTIONAL SENSOR IN DRIVE AXIS

722 SELECTIVE DRIVE AXIS

SUSPENSION ARM 942

720 SELECTIVE DRIVE MOTOR

EXAMPLE FRONT SUSPENSION OF A MAINTENANCE APPARATUS 900

SUSPENSION ARM 940

710 MOTOR CONTROL

EXAMPLE FRONT SUSPENSION OF A MAINTENANCE APPARATUS
900A

CASTER SWIVEL AXIS
918A

932A
ARM-SWIVEL
AXIS COUPLING

914A
RIGHT FRONT WHEEL

926A
SHARED FRONT
WHEEL AXIS ARM

922A
MOTOR-ARM
COUPLING

920A
SELECTIVE DRIVE
MOTOR

926A
SHARED
FRONT
WHEEL
AXIS ARM

932A

CASTER SWIVEL AXIS
918A

912A
LEFT FRONT WHEEL

EXAMPLE CASTER WHEEL WITH SELECTIVE DRIVE MOTOR
1000

SELECTIVE
DRIVE MOTOR
720

942 SUSPENSION
ARM

1030
CASTER
WHEEL

722
SELECTIVE DRIVE
AXIS

1022
SELECTIVE DRIVE AXIS
ROTATION MECHANISM

710 MOTOR CONTROL

SUSPENSION ARM 940

EXAMPLE CASTER WHEEL ROTATIONAL FORCE 1100

SELECTIVE DRIVE MOTOR 720

OPTIONAL SENSOR IN SELECTIVE DRIVE AXIS 930

FORWARD DIRECTION (ZERO ANGLE) 1122

FRICTION 1130

WHEEL ORIENTATION 1124

ANGULAR DISPLACEMENT 1126

1030

ROTATION IN RE FRICTION MINIMIZING DISPLACEMENT 1132

SPIN AXIS 114

CASTER TRAIL 410

SELECTIVE SWIVEL/ DRIVE AXIS 618

CASTER WHEEL ORIENTATION SENSOR 1200

SWIVEL AXIS ORIENTATION SENSOR 1210

618

SENSOR WIRING 1210

SELECTIVE SWIVEL/ DRIVE AXIS

CASTER WHEEL ORIENTATION SENSOR 1200

SELECTIVE DRIVE MOTOR 720

SWIVEL AXIS ORIENTATION SENSOR 1210

SENSOR MOUNT 1215

SELECTIVE SWIVEL/ DRIVE AXIS 618

CASTER WHEEL 500

940

SUSPENSION ARM

116

CASTER ARM

MAINTENANCE APPARATUS WITH CONDITIONAL MOTOR DRIVE FOR CASTER WHEELS

CROSS-REFERENCE TO RELATED APPLICATION

This application for patent claims the benefit of priority from U.S. Provisional Patent Application No. 63/306,717 filed Feb. 4, 2022, which is hereby incorporated by reference herein in its entirety and for all purposes.

INCORPORATION BY REFERENCE

The following are hereby incorporated by reference within the present disclosure in their respective entireties and for all purposes: U.S. patent application Ser. No. 17/313,407 filed May 14, 2021, and titled: CASTER WHEEL ASSEMBLY FOR AN OUTDOOR POWER EQUIPMENT MACHINE, U.S. patent application Ser. No. 15/342,239 filed Nov. 3, 2016, and titled: MAINTENANCE VEHICLE, and U.S. Pat. No. 9,327,553 filed Jun. 20, 2014 and titled: MOWER WITH FRONT CASTER WHEEL SUSPENSION.

FIELD OF DISCLOSURE

The disclosed subject matter pertains to apparatuses and methods for steering a power equipment, for instance, integrating selectively powered motor drive for directional control of a caster wheel of a maintenance apparatus.

BACKGROUND

Manufacturers of power equipment for outdoor maintenance applications offer many types of machines for general maintenance and mowing applications. Generally, these machines can have a variety of forms depending on application, from general urban or suburban lawn maintenance, rural farm and field maintenance, to specialty applications. Even specialty applications can vary significantly. For example, mowing machines suitable for sporting events requiring moderately precise turf, such as soccer fields or baseball outfields may not be suitable for events requiring very high-precision surfaces such as golf course greens, tennis courts and the like.

Modern maintenance machines also offer multiple options for power source. The various advantages associated with electric motor engines, gasoline engines, natural gas engines, diesel engines and so forth also impact the mechanical design and engineering that go into these different maintenance devices. Meeting the various challenges associated with different maintenance and mowing applications and the benefits and limitations of different power sources results in a large variety of maintenance machines to meet consumer preferences.

BRIEF SUMMARY

The following presents a simplified summary in order to provide a basic understanding of some aspects of the disclosure. This summary is not an extensive overview of the disclosure. It is not intended to identify key/critical elements or to delineate the scope of the disclosure. Its sole purpose is to present some concepts of the disclosure in a simplified form as a prelude to the more detailed description that is presented later.

Embodiments of the present disclosure provide for a maintenance apparatus having one or more motors attached to caster wheels of the maintenance apparatus. The caster wheels can have a caster trail that, in response to motion of the apparatus, minimizes angular displacement of the caster wheel relative to a direction of that motion. In further embodiments, the motor(s) attached to the caster wheel can be selectively activated or deactivated. When deactivated, the caster wheels operate without a directional force that is independent of the motion of the maintenance apparatus, and are oriented by other motive forces of the maintenance apparatus (e.g., the drive wheels) and forces in response thereto (e.g., friction and a rotational force proportional to the caster trail). When activated, one or more motors can control a direction of one or more caster wheels independent or at least in part independent of the other motive forces of the maintenance apparatus. The one or more motors can be selectively activated or deactivated by an operator of the maintenance apparatus, in an embodiment. The one or more motors can be selectively activated or deactivated in response to a remote control signal in another embodiment (e.g., in a drive-by-wire embodiment). The one or more motors can be selectively activated or deactivated by a controller of the apparatus in yet other embodiments.

Further embodiments of the present disclosure describe a lawn maintenance apparatus. The lawn maintenance apparatus can comprise a frame, a mow deck secured to the frame and comprising an implement, a drive wheel secured to the frame rotatable about a drive wheel rotation axis, and a power source secured to the frame providing mechanical power to the drive wheel or to the implement of the mow deck. In addition, the lawn maintenance apparatus can comprise a caster wheel secured to the frame by way of a caster arm, the caster arm having a spin axis securing the caster wheel to the caster arm and facilitating rotation of the caster wheel within the caster arm, and the caster arm having a swivel axis securing the caster arm to the frame facilitating rotation of the caster arm and the caster wheel. In additional embodiments, the lawn maintenance apparatus can include a motor having a selectively activated and deactivated motor drive with variable magnitude output connected to the swivel axis of the caster arm and configured to, when activated, applying a rotational force to the swivel axis. In further embodiments, the lawn maintenance apparatus can include a gauge for measuring a condition pertaining to the maintenance apparatus, and a controller for receiving an output from the gauge indicative of whether the condition is satisfied and configured to activate the motor in response to the gauge indicating the condition is satisfied.

In one or more other embodiments, the present disclosure includes a method for a maintenance apparatus that comprises a drive wheel, a caster wheel with a non-zero caster trail and connected to a selectively activatable motor, a power source and an implement. The method can comprise obtaining a measurement of a force acting upon a component of the maintenance apparatus in response to driving and operating the implement of the maintenance apparatus. Further, the method can comprise comparing the measurement of the force to a condition stored at a power controller and determining whether the measurement of the force satisfies the condition. Still further, the method can comprise converting the measurement of the force upon the component to a torque upon a caster wheel of the maintenance apparatus in response to determining the measurement of the force satisfies the condition. In various embodiments, the torque upon the caster wheel creates a rotational force upon the caster wheel. Further to the foregoing, the method can comprise signaling the selectively activatable motor to apply the torque and the rotational force upon the caster wheel in response to determining the measurement of the force satisfies the condition.

To accomplish the foregoing and related ends, certain illustrative aspects of the disclosure are described herein in connection with the following description and the drawings. These aspects are indicative, however, of but a few of the various ways in which the principles of the disclosure can be employed and the subject disclosure is intended to include all such aspects and their equivalents. Other advantages and features of the disclosure will become apparent from the following detailed description of the disclosure when considered in conjunction with the drawings.

BRIEF DESCRIPTION OF THE DRAWINGS

FIGS. 12, 12A and 12B show an example orientation sensor for a caster wheel to detect rotational position of the caster wheel, in further embodiments.

Figure 1:
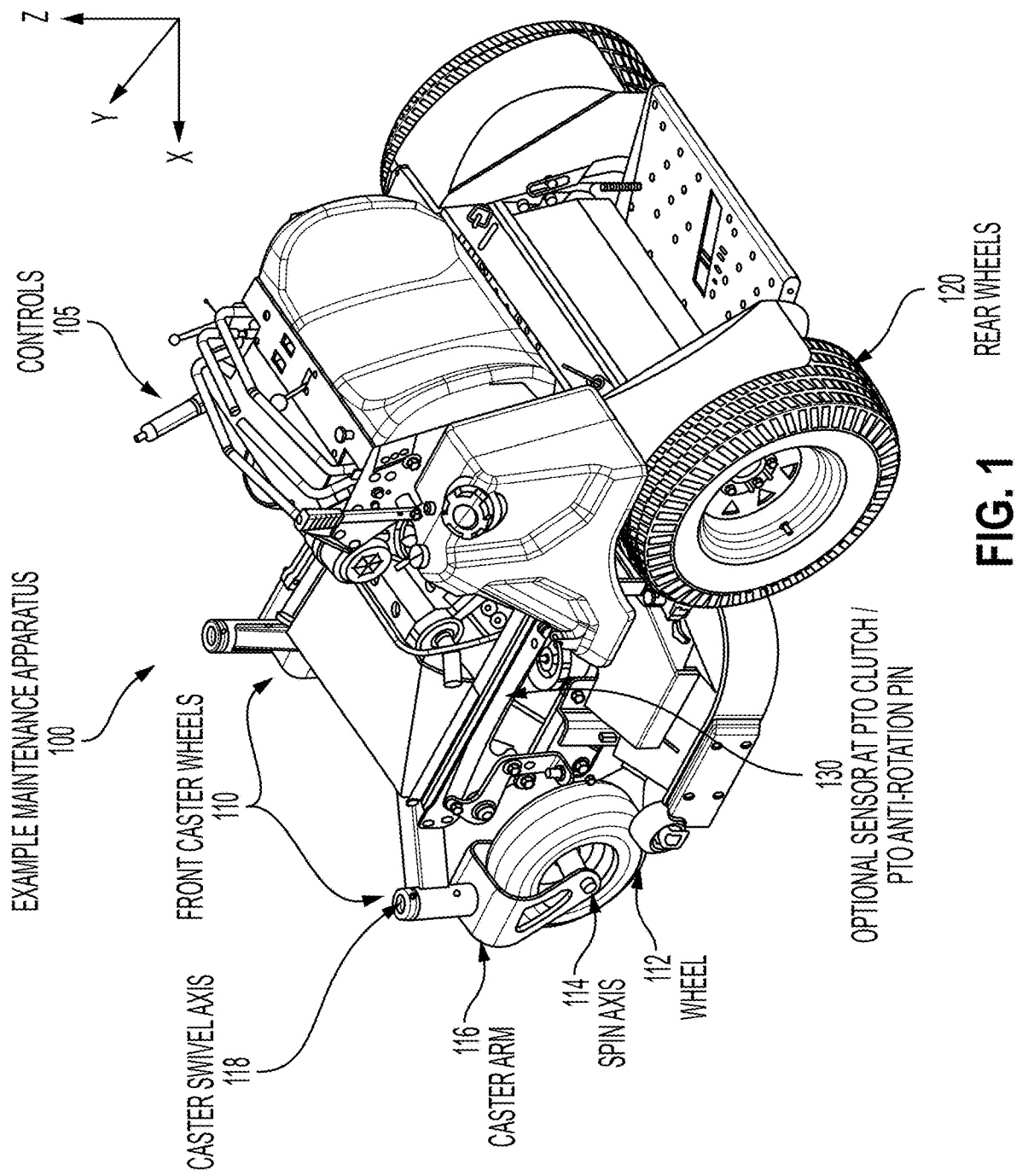
FIG. 1 provides an illustration of an example lawn maintenance device for a standing operator with independent caster wheels, according to disclosed embodiments.

It should be noted that the drawings are diagrammatic and not drawn to scale. Relative dimensions and proportions of parts of the figures have been shown exaggerated or reduced in size for the sake of clarity and convenience in the drawings. The same reference numbers are generally used to refer to corresponding or similar features in the different embodiments, except where clear from context that same reference numbers refer to disparate features. Accordingly, the drawings and description are to be regarded as illustrative in nature and not as restrictive.

While embodiments of the disclosure pertaining to machine vision systems for power equipment machines are described herein, it should be understood that the disclosed machines, electronic and computing devices and methods are not so limited and modifications may be made without departing from the scope of the present disclosure. The scope of the systems, methods, and electronic and computing devices for machine vision devices are defined by the appended claims, and all devices, processes, and methods that come within the meaning of the claims, either literally or by equivalence, are intended to be embraced therein.

DETAILED DESCRIPTION

The following terms are used throughout the description, the definitions of which are provided herein to assist in understanding various aspects of the subject disclosure.

As used in this application, the terms "outdoor power equipment", "outdoor power equipment machine", "power equipment", "maintenance machine" and "power equipment machine" are used interchangeably and are intended to refer to any of robotic, partially robotic ride-on, manually operated ride-on, walk-behind, sulky equipped, autonomous, semi-autonomous (e.g., user-assisted automation), remote control, or multi-function variants of any of the following: powered carts and wheel barrows, motorized or non-motorized trailers, lawn mowers, lawn and garden tractors, cars, trucks, go-karts, scooters, buggies, powered four-wheel riding devices, powered three-wheel riding devices, lawn trimmers, lawn edgers, lawn and leaf blowers or sweepers, hedge trimmers, pruners, loppers, chainsaws, rakes, pole saws, tillers, cultivators, aerators, log splitters, post hole diggers, trenchers, stump grinders, snow throwers (or any other snow or ice cleaning or clearing implements), lawn, wood and leaf shredders and chippers, lawn and/or leaf vacuums, pressure washers, lawn equipment, garden equipment, driveway sprayers and spreaders, and sports field marking equipment. Operator controlled vehicles can also be implemented in conjunction with various embodiments of the present disclosure directed to selectively powered caster wheel steering.

FIG. 1 illustrates a diagram of an example maintenance apparatus 100 according to one or more embodiments of the present disclosure. Maintenance apparatus 100 can be a standing operator device in which an operator can stand on a rear portion of maintenance apparatus 100 to access controls 105 of maintenance apparatus 100 including to drive, steer and otherwise control maintenance apparatus 100.

Maintenance apparatus 100 includes rear wheels 120 and front caster wheels 110 secured to a frame of maintenance apparatus 100. Rear wheels 120 can be drive wheels, in one or more embodiments, that are powered by a power source (not depicted) that provides mechanical power to rear wheels 120. The power source can be a combustion engine, in an embodiment, including a transmission system that distributes mechanical power from the combustion engine to rear wheels 120. In other embodiments, the power source can be one or more hydraulic motors that supply mechanical power to rear wheels 120. As an example, a single hydraulic motor and a transmission system can distribute mechanical power to rear wheels 120, in at least one such embodiment, whereas in other embodiments a first hydraulic motor and a second hydraulic motor can supply mechanical power to a first of the rear wheels 120 and to a second of the rear wheels 120, respectively. In still further embodiments, the power source can be one or more electric motors that supply mechanical power to rear wheels 120. For instance, a single electric motor and a transmission system can distribute mechanical power to rear wheels 120, or as an alternative, a first electric motor and a second electric motor can supply mechanical power to the first of the rear wheels 120 and to the second of the rear wheels 120, respectively.

Front caster wheels 110 of maintenance apparatus 100 can be secured to the frame thereof at least in part by way of a caster swivel axis 118. In the embodiment illustrated by FIG. 1, caster swivel axis 118 permits rotation of a caster arm 116 and wheel 112 of front caster wheels 110 about an axis perpendicular to or substantially perpendicular to a surface upon which maintenance apparatus 100 is supported (see also FIG. 11, infra). Additionally, caster arm 116 includes a spin axis 114 facilitating rotation of wheel 112 within caster arm 116. In the embodiment illustrated by FIG. 1, caster swivel axis 118 can be a lubricated bearing, pin, rod, or the like, that affords minimal resistance to rotation, allowing caster arm 116 and wheel 112 to rotate in response to motion of maintenance apparatus 100 (e.g., see FIG. 5, infra).

Although not depicted by FIG. 1, in various embodiments a motor (e.g., electric motor, or the like) can be connected to caster swivel axis 118 to apply an active torque on caster swivel axis 118 to, at least in part, effect directional control over wheel 112 (see FIGS. 6-11, infra). The active torque applied by the motor(s) can be in addition to a friction torque applied to caster arm 116 in response to movement of maintenance apparatus 100 (see FIG. 11, infra), and can be in the same (vector) direction or in an opposite (vector) direction as the friction torque. The active torque can be applied by the motor upon being activated, such that when deactivated no active torque is applied to caster swivel axis 118 and when activated the active torque is applied to caster swivel axis 118. In an embodiment, an operator of maintenance apparatus 100 can activate or deactivate the motor by way of controls 105. Moreover, the active torque, when the motor is activated, can have a magnitude selected by a controller as provided herein. For instance, the magnitude of the active torque can be selected by the controller to be proportional to a force upon a component of maintenance apparatus 100, optionally measured by a sensor 130 (see below). Optionally, the controller can condition activation of the motor upon satisfaction of a condition. The condition can be in whole or in part dependent upon the force upon the component of maintenance apparatus 100, in an embodiment. As a particular example, the condition can be dependent upon the force equaling (or exceeding) a threshold magnitude, the force being above a first threshold magnitude and below a second threshold magnitude (the second threshold magnitude being higher than the first threshold magnitude), and so forth. The controller can monitor the condition and maintain activation of the motor, in such embodiments, so long as the condition is satisfied. In at least one embodiment, the controller can maintain activation of the motor until a second condition is satisfied, such as the force falling below a third threshold magnitude that is less than the first threshold magnitude.

In some aspects of the foregoing embodiments, the condition and threshold magnitude(s) can be selected to configure the controller to counter directional impact of a force or torque upon maintenance apparatus 100. Measurement of the force or torque by sensor(s) 130 can allow a controller to determine a suitable amount of rotational force at caster swivel axis 118 is required to minimize or negate the directional impact. The first threshold magnitude can be selected at a value suitable to engage the controller to counter the directional impact, ignoring torques or forces below the first threshold magnitude. The second threshold magnitude can optionally be selected at a higher magnitude than the first threshold magnitude to avoid countering a large directional force intended by an operator, such as a turn (particularly a low radius turn) that results in a significant gravitational force on maintenance apparatus 100 but is a desired directional control that should not be countered. The third threshold magnitude (for deactivating the active motor control) can be selected at a suitable value below the first threshold magnitude to avoid repeated activation/deactivation when the measured force or torque is near the first threshold magnitude; instead deactivation can be conditioned on a suitable drop in measured force or torque to avoid relatively rapid activation/deactivation cycling.

In one or more embodiments, the motor can be activated in response to an operator input at controls 105, or at a remote control device (not depicted). In such embodiments, the magnitude of the active torque can be selected by the controller in proportion to a force or torque upon the component of maintenance apparatus 100, as described herein in some such embodiments. In other such embodiments, the magnitude of the active torque can be selected by the controller to steer the caster wheel 110 to a target direction. The target direction can be established by an input from a steering device and a conversion by the controller of the input from the steering device to an angle that corresponds to the target direction. Devices (e.g., position sensors, speed sensors, orientation sensors, direction sensors, and so forth) and algorithms for determining current direction and a displacement angle between the current direction and the target direction, and algorithms for selecting the magnitude of a motor to effect turning caster wheel 110 by the displacement angle—known in the art or reasonably conveyed to one of ordinary skill in the art by way of the context provided herein are considered within the scope of the present disclosure. The steering device can be a set of hand bars, such as illustrated by controls 105, or a set of lap bars, a steering wheel, a jog-wheel, a joystick, a remote control device, location guided autonomous control steering unit (not depicted) utilizing robotic vision, satellite location control, onboard or offboard location sensors or signal source (e.g., beacon, radio tower, radio emitter, etc.), and so on, or the like, or a suitable combination of the foregoing. Moreover, the controller can monitor the current direction and periodically adjust the angle of the caster wheel 110 to maintain the target direction while the active caster control is maintained by the operator input, in such embodiments.

In at least one embodiment controls 105 can be one or more hand bars for operation by a standing operator, or can be one or more lap bars for operation by a seated operator. In one aspect of this embodiment(s), a pair of hand bars or lap bars can control steering by individually providing a relative drive speed to one drive wheel of maintenance apparatus 100. As an illustration, a left hand/lap bar can provide a first relative drive speed to a left drive wheel of maintenance apparatus 100, and a right hand/lap bar can provide a second relative drive speed to a right drive wheel of maintenance apparatus 100. When the first relative drive speed and second relative drive speed are substantially equal, maintenance apparatus 100 will drive in a straight line (or substantially straight line). Where the first relative drive speed is greater than or less than the second relative drive speed, the left drive wheel will rotate faster or slower, respectively, then the right drive wheel causing maintenance apparatus 100 to execute a turn. In another aspect of this embodiment(s), the one or more hand bars or lap bars can (in combination) provide integrated relative control over both wheels, and not respective control over an individual wheel. Such an embodiment can be implemented with an electronic controller (not depicted) that receives relative position location information of a plurality of hand/lap bars and outputs appropriate wheel rotation speeds of both the left drive wheel and right drive wheel to achieve a relative wheel speed associated with the relative positional location information. In this aspect movement of either hand/lap bar to a greater (or lesser) deviation from a neutral position relative to another hand/lap bar can cause one drive wheel to rotate at a first speed and a second drive wheel to rotate at a second speed different from the first speed, causing maintenance apparatus 100 to execute a turn. Described differently, relative positions of the hand/lap bars are utilized by a controller to establish relative speeds of two drive wheels, rather than each hand/lap bar establishing speed of only one wheel. In various aspects of this embodiment(s) then, the hand/lap bar implementation of the steering device can be implemented with a single hand/lap bar controlling speed of a single drive wheel, or with either and both hand/lap bars operable to control relative speed of both drive wheels.

Maintenance apparatus 100 can additionally optionally comprise a sensor(s) 130. Sensor(s) 130 can be located at a component of maintenance apparatus 100 and be configured to measure a physical effect (e.g., a force, a torque, etc.) on the component of the maintenance apparatus 100, in some embodiments. In one or more such embodiments, sensor(s) 130 can be a torque sensor (e.g., a strain gauge, an electronic torque gauge, or the like). The torque sensor can be located to measure torque on an implement of maintenance apparatus 100. As an illustrative example, where maintenance apparatus 100 includes a mow deck (and the implement is a blade of the mow deck) the torque sensor can be located at a PTO clutch or a PTO anti-rotation pin to measure torque on the implement of the maintenance apparatus 100. Where maintenance apparatus 100 includes a pair of motors (e.g., respectively driving one of rear wheels 120) the sensor can be a differential sensor. In such embodiment(s), the sensor(s) 130 can measure a difference in power consumption or torque output at the respective motors. In other embodiments, sensor 130($s$) can be a gravitational sensor (e.g., an inertial measurement unit (IMU), a gyroscopic sensor to measure roll, pitch or yaw, or the like). In the latter embodiments, sensor(s) 130 can measure a gravitational effect on maintenance apparatus 100 resulting from a non-zero pitch (rotation about an x-axis within a y-z Euclidean plane where a y-axis defines a direction of motion) or a non-zero roll (rotation about the y-axis within an x-z Euclidean plane) defined with respect to a z-axis that is collinear with a gravitational vector of the Earth. In still further embodiments, sensor(s) 130 can include a GPS position sensor, a direction and orientation sensors such as the IMU, a camera, a set of wheel rotation counters for drive wheels 120, or the like, or a suitable combination of the foregoing. Such sensors can be utilized when active control of caster wheels 110 are utilized to implement directional steering according to steering commands, in one or more embodiments.

As utilized herein, relative terms or terms of degree such as approximately, substantially or like relative terms such as about, roughly and so forth, are intended to incorporate ranges and variations about a qualified term reasonably encountered by one of ordinary skill in the art in fabricating or compiling the embodiments disclosed herein, where not explicitly specified otherwise. For instance, a relative term can refer to ranges of manufacturing tolerances associated with suitable manufacturing equipment (e.g., injection molding equipment, extrusion equipment, metal stamping equipment, and so forth) for realizing a mechanical structure from a disclosed illustration or description. In some embodiments, depending on context and the capabilities of one of ordinary skill in the art, relative terminology can refer to a variation in a disclosed value or characteristic; e.g., a 0 to five-percent variance or a zero to ten-percent variance from precise mathematically defined value or characteristic, or any suitable value or range there between can define a scope for a disclosed term of degree. As an example, the axis about which caster wheels 110 and caster arm 116 can rotate can be perpendicular to the surface upon which maintenance apparatus 100 is supported, or substantially perpendicular: such as perpendicular with a variance within reasonable manufacturing tolerances, a variance of 0 to five-percent of 180 degrees, a variance of 2-3 degrees or less, or any suitable value or range there between. These or similar variances can be applicable to other contexts in which a term of degree is utilized herein such as timing of a computer-controlled signal, torque applied by a motor onto a component of a disclosed maintenance apparatus, accuracy of measurement of a physical effect (e.g., a torque, a relative torque output, a relative electric power consumption, etc.) or the like.

In a further embodiment, one or both of front caster wheels 110 can have a drive motor (not depicted) responsive to a drive control mechanism of maintenance apparatus 100 configured to drive rotation of wheel(s) 112 about spin axis 114. The drive motor can be mechanically inline with spin axis 114, in some aspects of this embodiment, or can be secured to caster arm 116 or other suitable mounting position to facilitate driving rotation of wheel(s) 112 about spin axis 114. Additionally, the drive motor can be responsive to acceleration or speed controls of maintenance apparatus 100, increasing drive motor rotation speed in response to increasing speed signal from the acceleration or speed controls, and decreasing drive motor rotation speed in response to decreasing speed signal from the acceleration or speed controls. In a further aspect, the acceleration or speed controls that operate the drive motor can be the same acceleration or speed controls that control drive speed of rear wheels 120. In other aspects, the acceleration or speed controls that operate the drive motor can be independent of controls that drive rear wheels 120, or partly independent and partly integrated with the controls that drive rear wheels 120.

In one or more aspects of the present disclosure, controls 105 can include a lock control mechanism. The lock control mechanism can be configured to maintain front caster wheels 110 in a stationary position(s) (or substantially stationary position(s)) about caster swivel axis 118. The stationary position can be a forward position aligning front caster wheels 110 with a direction of motion of maintenance apparatus 100 and causing front caster wheels 110 and maintenance apparatus 100 to move in a straight (or substantially straight) line. As an alternative or in addition, a second stationary position can align front caster wheels 110 in a turned position at an angle to a direction of motion of maintenance apparatus 100, causing maintenance apparatus 100 to maintain a constant (or substantially constant) turn radius. The lock control mechanism can achieve the maintenance of a front caster wheel(s) 110 in the stationary position(s) about caster swivel axis 118 by way of a selective drive motor(s) (e.g., see selective drive motor and axis 620 of FIG. 6 infra, among other examples provided herein)

affecting rotation of front caster wheel(s) 110 about a caster swivel axis 118, in some aspects of this embodiment. For example, in response to activation of the lock control mechanism, the selective drive motor(s) can apply a force to a front caster wheel(s) 110 resisting rotation of the front caster wheel(s) 110 away from a stationary position about caster swivel axis 118. As another example, in response to activation of the lock control mechanism, the selective drive motor(s) can mechanically lock rotation of the front caster wheel(s) 110 about caster swivel axis 118, maintaining front caster wheel(s) 110 in a fixed rotational position about caster swivel axis 118. In some aspects, each front caster wheel 110 can have a separate selective drive motor for controlling rotation of the respective front caster wheel 110 about the respective caster swivel axis 118. In other aspects, a single front caster wheel 110 has a selective drive motor for controlling rotation of the single front caster wheel 110 about its caster swivel axis 118, and the opposite front caster wheel 110 is not locked or driven to a rotation orientation.

According to various implementations, the lock control mechanism of controls 105 can enable an operator to lock front caster wheels 110 in a current position in response to activation of the lock control mechanism. In such implementation, the lock control mechanism can prevent rotation or apply force to resist rotation of front caster wheel(s) 110 away from a rotational position about caster swivel axis 118 a front caster wheel(s) 110 is in when the lock control mechanism is activated. In another implementation, the lock control mechanism of controls 105 can include a command returning front caster wheel(s) 110 to a zero rotation position (e.g., correlated with driving maintenance apparatus 100 in a straight line) in response to activation of the command. The front caster wheel(s) 110 can then be locked into the zero rotation position, or a force applied to resist rotation away from the zero rotation position, according to alternative implementations.

In further aspects of the present disclosure, a lock control mechanism can be automatically implemented by a steering control module of maintenance apparatus 100. In such aspects, the steering control module can activate the lock control mechanism in response to detecting an operating condition of maintenance apparatus 100 that has a logical association with the lock control mechanism stored in memory of the steering control module. The logical association can cause the steering control module to activate the lock control mechanism in response to detection of the operating condition. Examples of suitable operating conditions can be detecting a slip of rear wheels 120, detecting a deviation of maintenance apparatus 100 from an intended travel direction or an intended location stored in the steering control module, or the like.

In still further aspects of the present disclosure, a lock control mechanism can be implemented to lock a first front caster wheel 110 about its caster swivel axis 118 to a first rotational position, while a second front caster wheel 110 is driven by a selective drive motor to a second rotational position. The second rotational position can be different from the first rotational position. These aspects can be helpful to make small changes to a direction of motion of maintenance apparatus 100 and avoid significant deviations from a line of travel (for straight line travel) or from a turn curvature (for a turn or non-linear path) of maintenance apparatus 100. The first front caster wheel 110 maintained or locked in the first rotational position (e.g., a zero rotation position) will resist movement away from a current path of travel, while the second front caster wheel 110 is driven to the second rotational position will provide a force in a direction away from the current path of travel. In combination, the locked first front caster wheel 110 and driven second front caster wheel 110 will result in a small force toward the direction away from the current path of travel, effecting the small change in direction of motion of maintenance apparatus 100.

Figure 2:
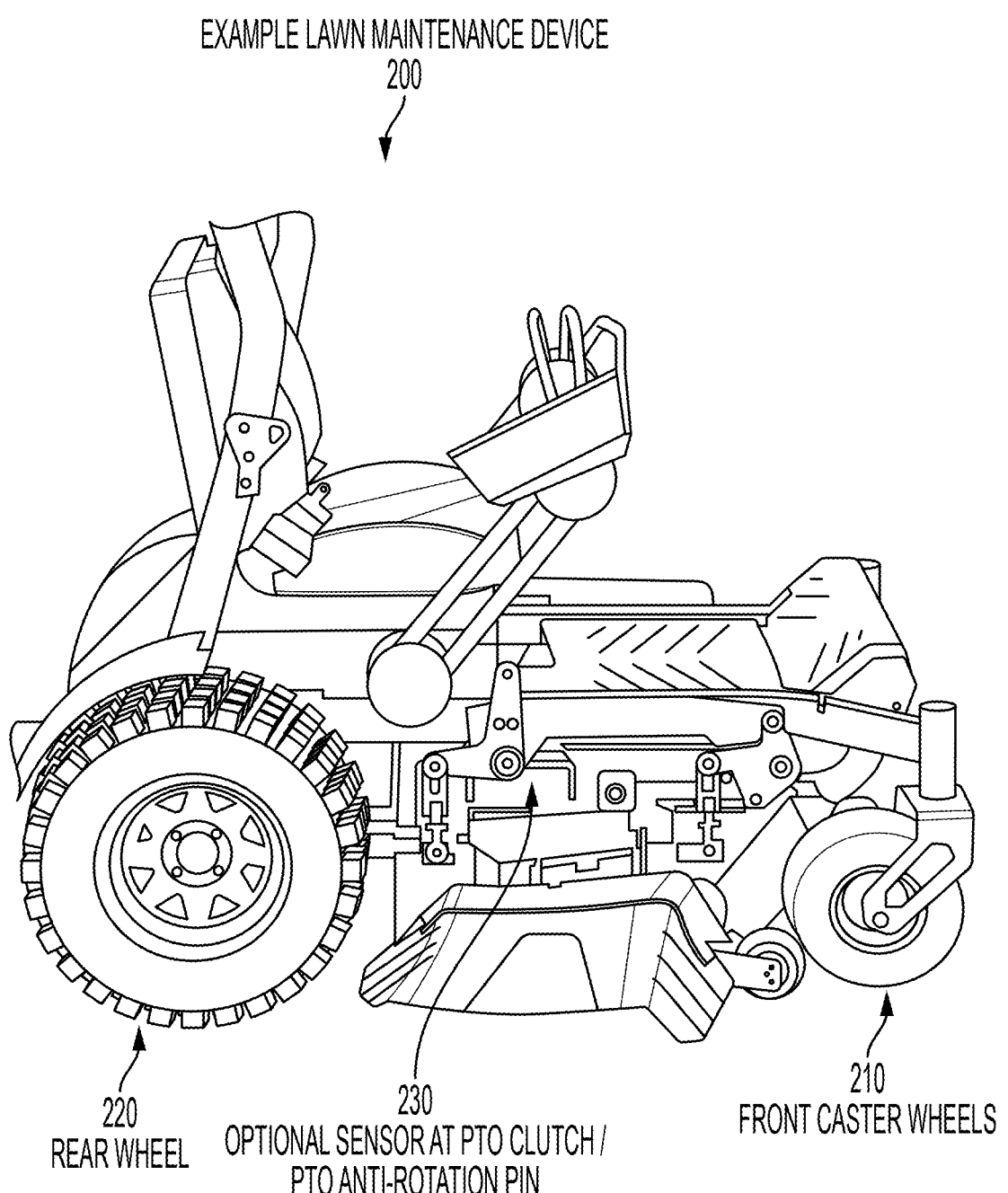
FIG. 2 includes a depiction of an example lawn maintenance device for a seated operator with independent caster wheels, in further embodiments.

FIG. 2 depicts a diagram of an example lawn maintenance apparatus 200 according to further embodiments of the present disclosure. Lawn maintenance apparatus 200 illustrates a seated operator device in which an operator can drive, operate and control lawn maintenance apparatus 200 from a seated position. Lawn maintenance apparatus 200 comprises a front caster wheel(s) 210 and rear wheels 220. Caster wheel(s) 210 can rotate freely about a rotation axis at a connection to a frame of lawn maintenance apparatus 200. In addition, rear wheels 220 can be driven by one or more motors or engines secured to the frame of lawn maintenance apparatus 200. Although not depicted (but see FIGS. 6-11, infra), lawn maintenance apparatus 200 can comprise one or more motors connected to front caster wheels in order to apply a torque on the rotation axis of the caster wheel(s) 210 and at least in part control direction of motion of lawn maintenance apparatus 200 from the front caster wheel(s) 210. In an embodiment, the one or more motors can apply the torque on the rotation axis in response to a force upon a component of lawn maintenance apparatus 200. To this end, a sensor 230 can optionally be provided to measure the force upon the component of lawn maintenance apparatus 200 to provide a measurement of the force to a controller (not depicted, but see FIG. 12, infra) operable to control the one or more motors.

Figure 3:
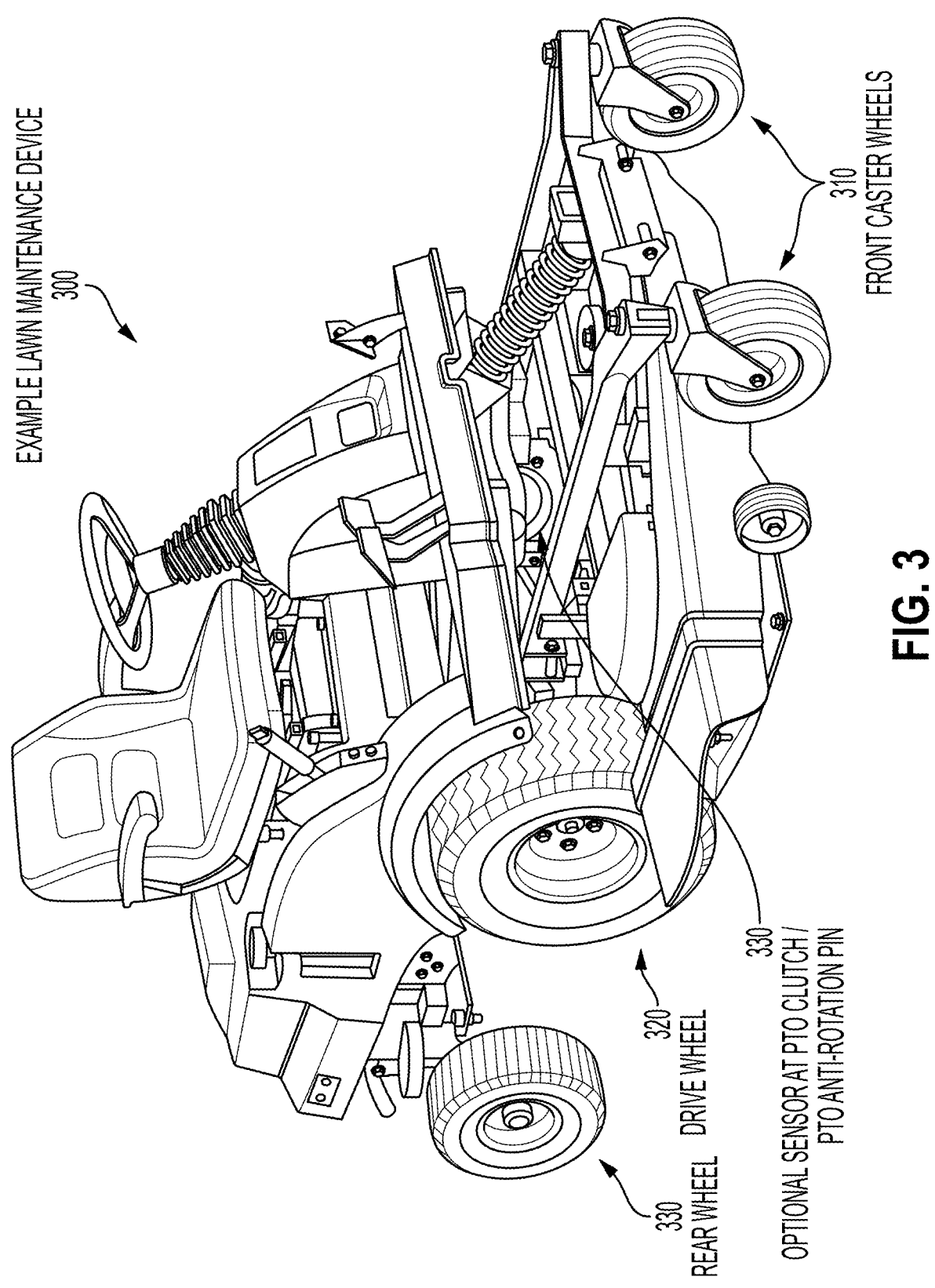
FIG. 3 provides an image of an example front-mounted lawn maintenance device for a seated operator and having independent caster wheels, in still other embodiments.

FIG. 3 depicts a diagram of a lawn maintenance device 300 according to further embodiments of the present disclosure. Lawn maintenance device 300 provides another embodiment of a maintenance apparatus having a front-mount mow deck. Further, lawn maintenance device 300 is a seated operator apparatus enabling an operator to drive, operate and control lawn maintenance apparatus 300 from a seated position. Lawn maintenance apparatus 300 also includes a set of front caster wheels 310 secured to a frame supporting the front-mount mow deck. One or more drive wheels 320 are provided, as well as a rear wheel(s) 330. Rear wheel(s) 330 can be a passive wheel(s) in some embodiments, or can be a steerable wheel in other embodiments. Similarly, drive wheels 320 can be constrained to move at the same speed (with steering controlled by rear wheel(s) 330 or front caster wheels 310) or can operate at different speeds to effect directional control (and steering) of lawn maintenance device 300.

Figure 4:
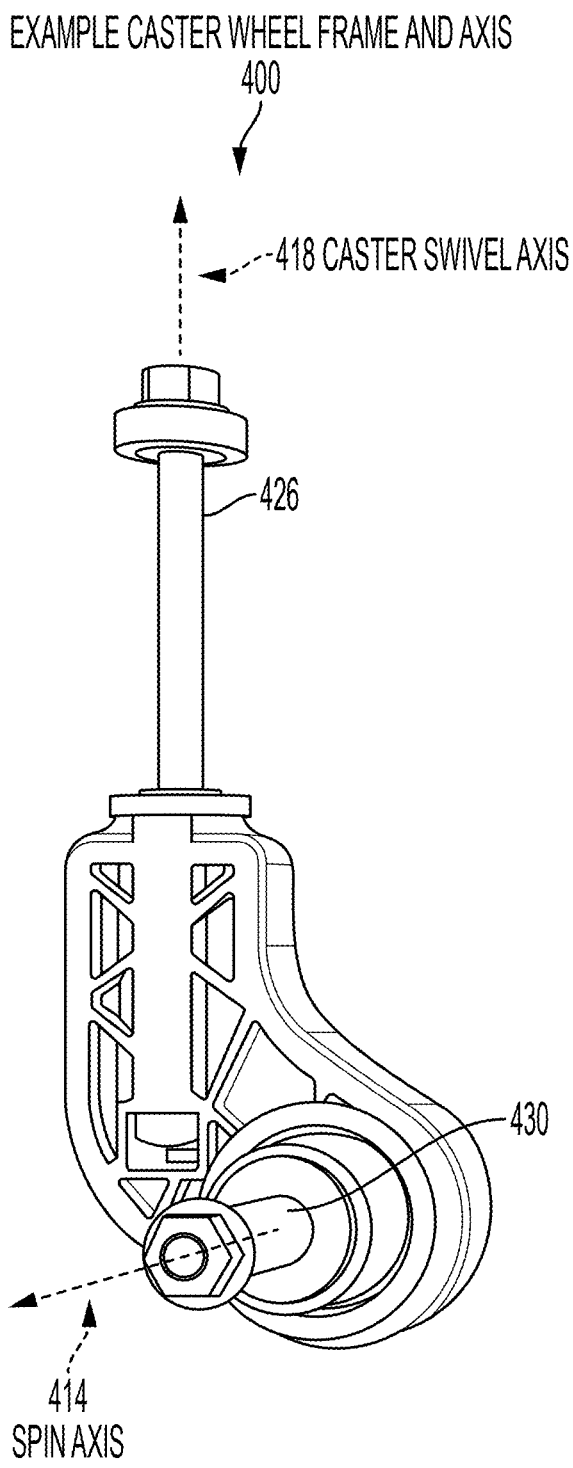
FIG. 4 depicts an example mechanical relationship between spin axis and swivel axis of a caster wheel having non-zero caster trail in an embodiment(s).

FIG. 4 illustrates an example diagram of a caster wheel frame and axis 400 according to alternative embodiments of the present disclosure. Caster wheel frame and axis 400 is one illustrative mechanism by which disclosed caster wheels can be implemented and is not intended to be limiting. In the embodiment depicted by FIG. 4, caster wheel frame and axis 400 includes a caster swivel axis 418 and a spin axis 414. Caster swivel axis 418 includes a mounting rod 426 to secure caster wheel frame and axis 400 to a maintenance apparatus. Caster wheel frame and axis 400 can rotate about caster swivel axis 418 to facilitate rotation of caster wheel frame and axis 400 about the mounting rod 426 and a frame of the maintenance apparatus. A wheel mount 430 is provided about spin axis 414 to mount a wheel (not depicted) to caster wheel frame and axis 400. The wheel can rotate on wheel mount 430 to spin about spin axis 414. A distance between the spin axis 414 and caster swivel axis 418 can define a caster trail (not depicted, but see FIG. 5, infra). The caster trail facilitates a frictional force on a caster wheel about caster swivel axis 418 that reduces an angular displacement between a direction of motion and a rotation of caster swivel axis 418, in one or more embodiments (e.g., see FIGS. 5 and 11, infra).

Figure 5:
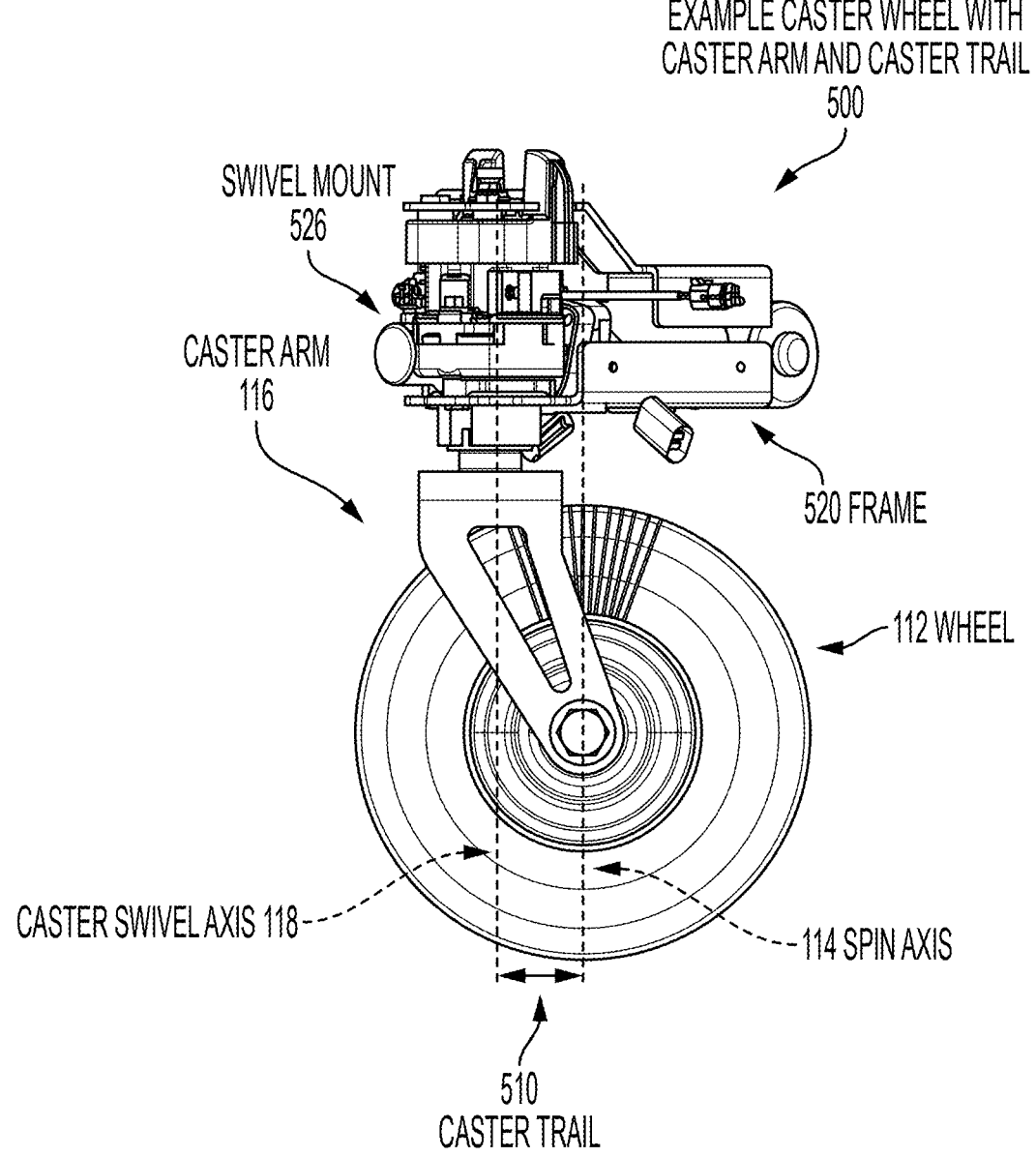
FIG. 5 illustrates an example caster wheel and caster trail with selective motor control in additional embodiments of the present disclosure.

FIG. 5 depicts an example diagram of a caster wheel 500 according to further embodiments of the present disclosure. Caster wheel 500 comprises a wheel 112 secured to a caster arm 116. The caster arm 116 secures the wheel 112 to a frame 520 of a maintenance apparatus 520 by way of a swivel mount 526. Swivel mount 526 facilitates rotation of caster arm 116 about a caster swivel axis 118, while caster arm 116 provides a mount for wheel 112 to spin about a spin axis 114. A distance between caster swivel axis 118 and spin axis 114 defines a caster trail 510 of caster wheel 500. In at least one alternative embodiment, however, a disclosed caster wheel can have zero caster trail, in which the spin axis 114 and caster swivel axis 118 are collinear or substantially collinear such that caster trail 510 is zero (or substantially zero).

Caster trail 510 can facilitate application of a rotational force on caster arm 116 in response to motion of wheel 112. For instance, a force upon frame 520 (e.g., supplied by a power source and a drive wheel of a disclosed maintenance apparatus) is translated to caster arm 116 by way of swivel mount 526 and to wheel 112 at the mount to spin axis 114. The force can in turn result in a rotational force proportional to a distance of caster trail 510 upon wheel 112 and caster arm 116 about caster swivel axis 118. This rotational force is in a direction that minimizes angular displacement between a direction of the force upon frame 520 and an orientation of caster arm 116 about caster swivel axis 118 (see FIG. 11, infra). By minimizing the angular displacement, the rotational force reduces drag and promotes rotation of wheel 112 along a surface in response to the force upon frame 520, mitigating or avoiding turfing of the surface.

Figure 6:
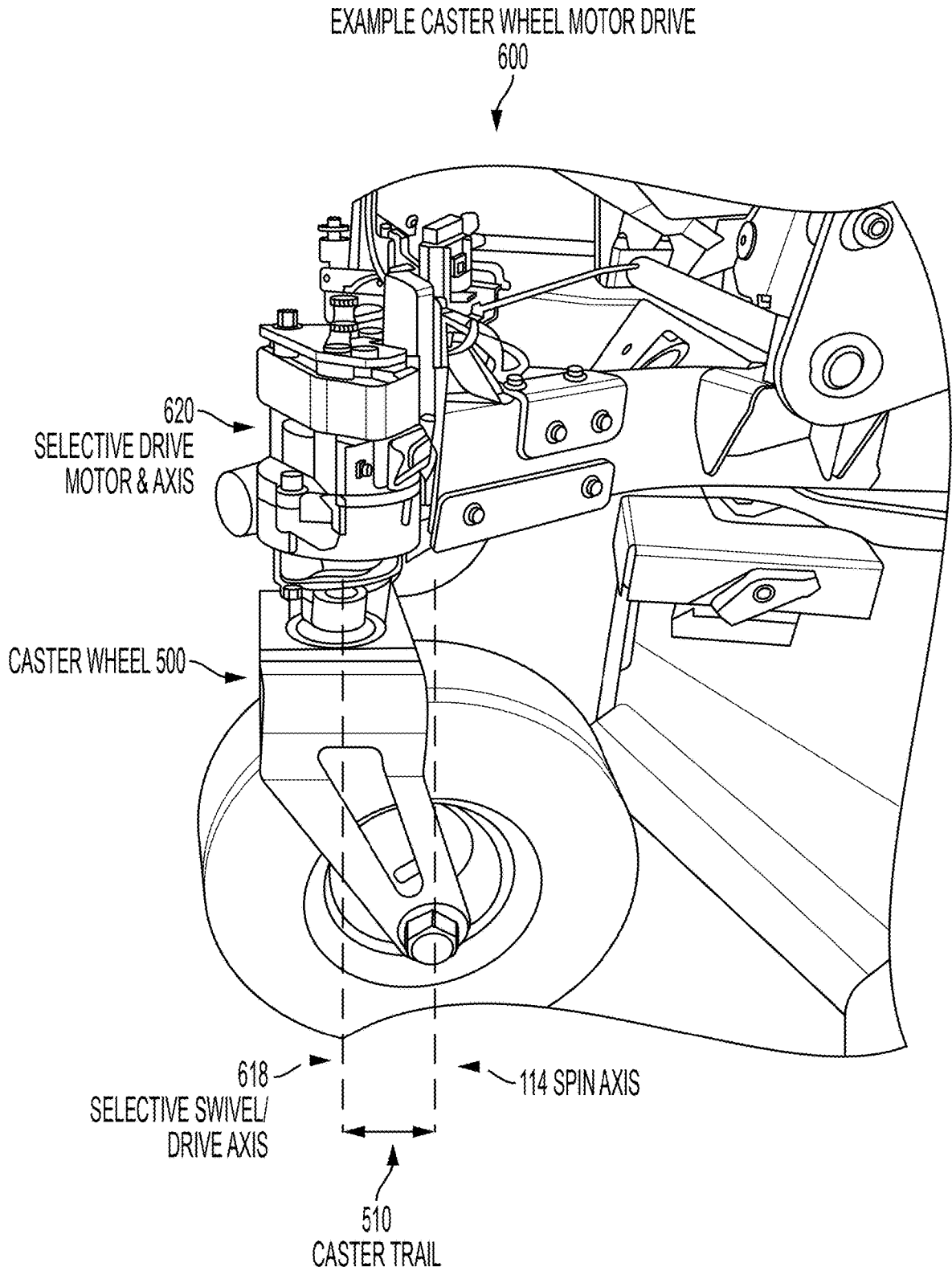
FIG. 6 provides an image of an example caster wheel motor drive and motor drive axis according to one or more embodiments.

FIG. 6 illustrates an image of an example caster wheel motor drive 600 according to further embodiments of the present disclosure. A caster wheel 500 is mechanically coupled to a selective drive motor and axis 620 facilitating rotation about a selective swivel/drive axis 618. Selective drive motor and axis 620 can include a motor responsive to an electric control signal. The motor can be passive (e.g., inactivated) and provide no (driven) force upon caster wheel 500 about the selective swivel/drive axis 618, when passive. In response to the electric control signal, the motor can activate to provide the force upon selective swivel/drive axis 618 to facilitate rotation of caster wheel 500 about the selective swivel/drive axis 618. In an embodiment, the selective swivel/drive axis 618 of selective drive motor and axis 620 can have an axial friction opposing rotation of caster wheel 500 about selective swivel/drive axis 618. The axial friction can be present even when the motor is passive (e.g., deactivated, receiving a default or minimal electric power, receiving no electric power, and so forth), in various embodiments. However, the rotation force proportional to caster trail 510 in response to movement of the maintenance apparatus can be effective to overcome the axial friction, in one or more embodiments. When activated, the motor of selective drive motor and axis 620 can have an output magnitude selected to overcome the axial friction of selective swivel/drive axis 618 and to orient the caster wheel 500 to a target direction, or to overcome the axial frication in addition to opposing a measured force upon a maintenance apparatus disclosed herein. In at least some embodiments, the drive axis of selective drive motor and axis 620 can be a lubricated rotational axis having negligible axial friction, and the output magnitude can be selected to orient the caster wheel 500 to the target direction, or the oppose the measured force without the magnitude selected to overcome the axial friction.

In some aspects of disclosed embodiments, selective drive motor and axis 620 can be operated in a low power mode to provide active dampening of rotation of caster wheel 500 about selective swivel/drive axis 618. The lower power model can be selected to apply less rotational force than required to initiate rotation of caster wheel 500 about selective swivel/drive axis 618 in view of mass of caster wheel 500, any rotational friction of selective swivel/drive axis 618 and force exerted on caster wheel 500 by the mass of a maintenance apparatus and frame that caster wheel 500 is secured to. Instead, the low power mode can be selected to apply a rotational force sufficient to mitigate rotation of caster wheel 500 about selective swivel/drive axis 618 in response to other forces (e.g., caster trail friction, gravitational force, and so on). In at least one aspect the magnitude of lower power rotational force can be adjustable by way of controls 105 (e.g., see FIG. 1, supra). In additional aspects, the low power mode can be implemented at a selective drive motor and axis 620 connected to a single caster wheel 500, or to both selective drive motor and axis 620 connected to both caster wheels 500, where suitable. In an alternative embodiment, selective drive motor and axis 620 or selective swivel/drive axis 618 can have an adjustable mechanical damper that is partly or wholly independent of power applied to selective drive motor and axis 620. The mechanical damper can resist rotation of caster wheel 500 by mechanical friction in various implementations. Example mechanical friction can include: an adjustable friction on mechanical gears within selective swivel/drive axis 618, an adjustable friction device adjacent to a rotational pin, rod, bearing, etc. of selective swivel/drive axis 618 that is configured to apply adjustable mechanical pressure to the rotational pin, rod, bearing, etc. to add adjustable friction thereto, or the like.

Figure 7:
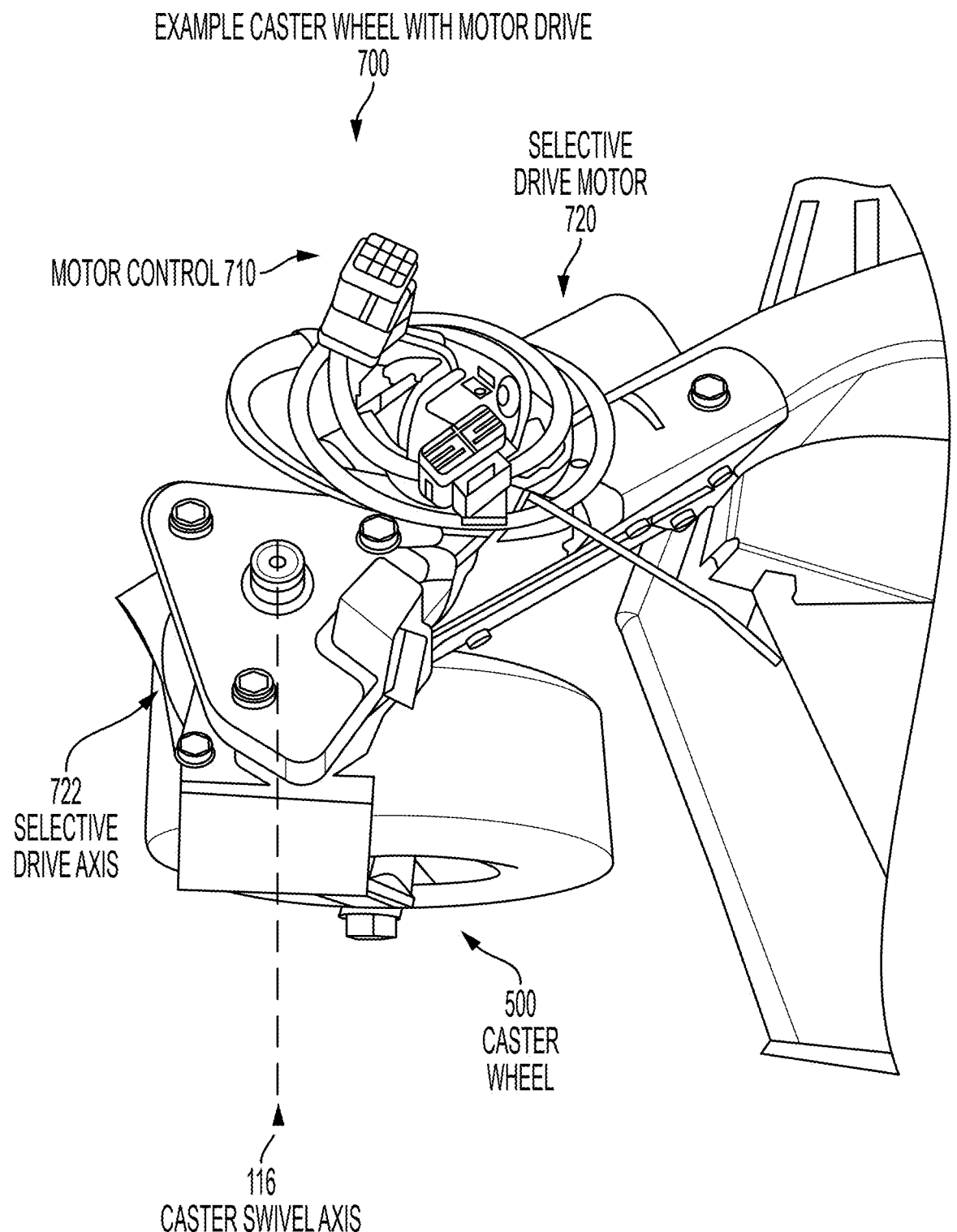
FIG. 7 provides an additional image of the example caster wheel motor drive and motor drive axis from an overhead view.

FIG. 7 depicts an image of a top view of an example caster wheel with motor drive 700 according to additional embodiments of the present disclosure. A caster wheel 500 is connected to a selective drive axis 722 and can be actively oriented about a caster swivel axis 116 by a selective drive motor 720. In response to a signal provided over a motor control 710, selective drive motor 720 can apply a rotational force to selective drive axis 722 to turn caster wheel 500 about caster swivel axis 116. The signal can also include a direction indication for determining whether to apply the rotational force in a clockwise or counter-clockwise angular direction (looking down from a top of caster swivel axis 116). In an embodiment, selective drive axis 722 can have an inherent axial friction opposing rotation of caster wheel 500 about caster swivel axis 116, whereas in an alternative embodiment selective drive axis 722 can have negligible axial friction. The rotational force applied by selective drive axis 722 can be selected to overcome the axial friction, where present, in addition to turning caster wheel 500 about the caster swivel axis 116.

In some embodiments, a magnitude of the rotational force can be selected to orient caster wheel 500 to a selected angle about the caster swivel axis (optionally further selected to overcome an axial friction) to facilitate driving (e.g., steering) a maintenance apparatus by way of the one or more caster wheels 500. In such embodiments, the selected angle can be in response to a steering control input provided by an operator (e.g., a mechanical, electrical or electromechanical input from a steering wheel, a set of lap bar controls, a set of standing bar controls such as illustrated by controls 105 of FIG. 1, supra, a jog-wheel or joystick steering device, an operator-guided remote control, or the like).

In other embodiments, the magnitude of the rotational force can be selected in proportion to a force upon the maintenance apparatus or a component of the maintenance apparatus (optionally further selected to overcome an axial friction of selective drive axis 722). In such embodiments, the rotational force provided by selective drive motor 720 on caster wheel 500 can facilitate counteracting an effect on steering of caster wheel 500 caused by the force upon the maintenance apparatus. As an example, a maintenance apparatus comprising a lawn mowing deck with rotating blades and a power source to drive mechanical rotation of the blades, produces a mechanical torque to cause the rotation and a mechanical torque (usually of different magnitude) to maintain the rotation in the presence of resistance on the blades. This torque (among others) can result in a directional force on the maintenance apparatus causing caster wheel 500 to turn, and potentially drift off from an intended driving course. In some disclosed embodiments, a measurement of torque on a component of the maintenance apparatus can be utilized to determine an associated force on the caster wheel 500. Selective drive motor 720 can be controlled to output a force upon selective drive axis 722 and caster wheel 500 proportional to the torque on the component. As an example, the force output by selective drive motor 720 can be selected to counter the force causing caster wheel 500 to turn; as another example the selective drive motor 720 can output a torque selected to counter the torque on the component (e.g., the torque causing the maintenance apparatus to turn). Other examples of selecting the magnitude of a selective drive motor 720 known in the art or reasonably conveyed to one of ordinary skill in the art by way of the context provided herein are considered within the scope of the present disclosure.

In still additional embodiments, the magnitude of the rotational force can be selected in proportion to a force differential or a torque differential upon drive wheels of the maintenance apparatus. In an example in which a pair of motors respectively output power to a pair of drive wheels, torque or power output generated by the motors will generally be equal when driving the maintenance apparatus in a straight line on a flat surface. A difference in torque or power by one motor over the other will generally cause one wheel to rotate faster than the other, turning the maintenance apparatus, or reflect a gravitational or other force upon the maintenance apparatus that can result in a drift from the straight line. In an embodiment, a sensor can be operated to measure the difference in torque or power between a first motor and a second motor of the pair of motors. In response to the sensor measuring a difference in torque at the first motor and the second motor, selective drive motor 720 can output a torque on caster swivel axis 116 and caster wheel 500 opposing the difference in torque, or opposing the turn or drift of the maintenance apparatus in response to the difference in torque.

In yet another embodiment, the magnitude of rotational force can be selected in proportion to a torque measured at a caster wheel of a disclosed maintenance apparatus. In such embodiment(s), a torque sensor at a caster wheel can measure a torque at selective drive axis 722 about caster swivel axis 116. A measurement of the torque can be provided to selective drive motor 720 to generate a counter torque at the selective drive axis 722 to oppose the measured torque at the caster wheel. In this embodiment, caster wheel with motor drive 700 can be configured to oppose a force upon caster wheel 500 and mitigate deviation of caster wheel 500 from a straight line. In at least one embodiment, this opposition to measured torque at the caster wheel can be activated when traveling in a straight line and deactivated when a turn is initiated (and the deviation from the straight line is intended).

Figure 8:
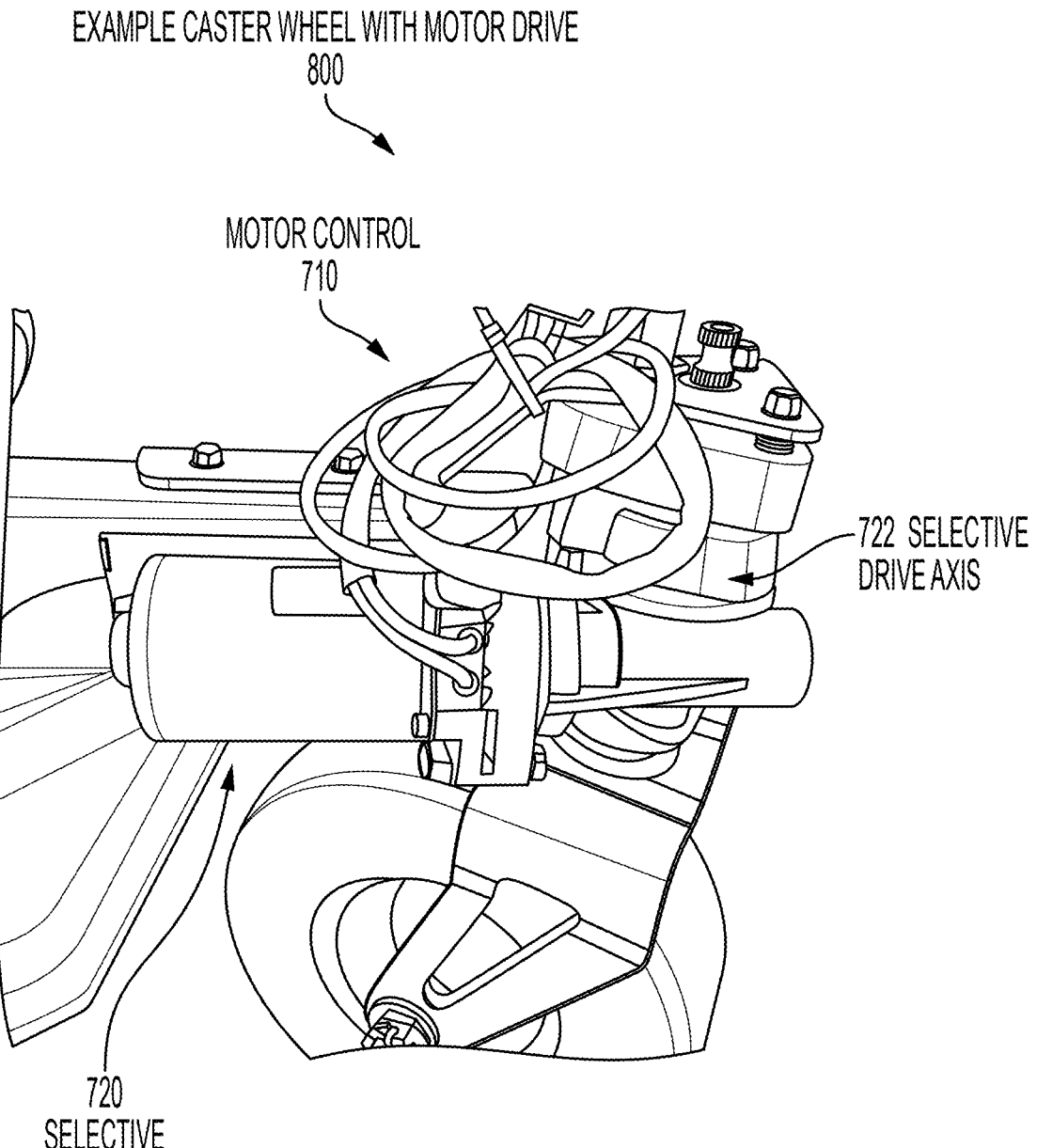
FIG. 8 depicts a further image of the example caster wheel motor drive and motor device axis from an interior view.

FIG. 8 illustrates an image of an example caster wheel with motor drive 800 illustrating additional aspects of disclosed embodiments. Caster wheel with motor drive 800 depicts the caster wheel from an interior of a frame of a maintenance apparatus to which caster wheel with motor drive 800 is secured. A selective drive motor 720 is mounted to the frame having a mechanical torque output located at a selective drive axis 722 of the caster wheel with motor drive 800. The caster wheel is secured to the selective drive axis 722, causing the torque output provided to the selective drive axis 722 to apply a rotational force to the caster wheel. A motor control 710 is connected to selective drive motor 720 to cause the selective drive motor 720 to generate the torque output, and in one or more embodiments, to specify a direction and magnitude of the torque output.

Figure 9:
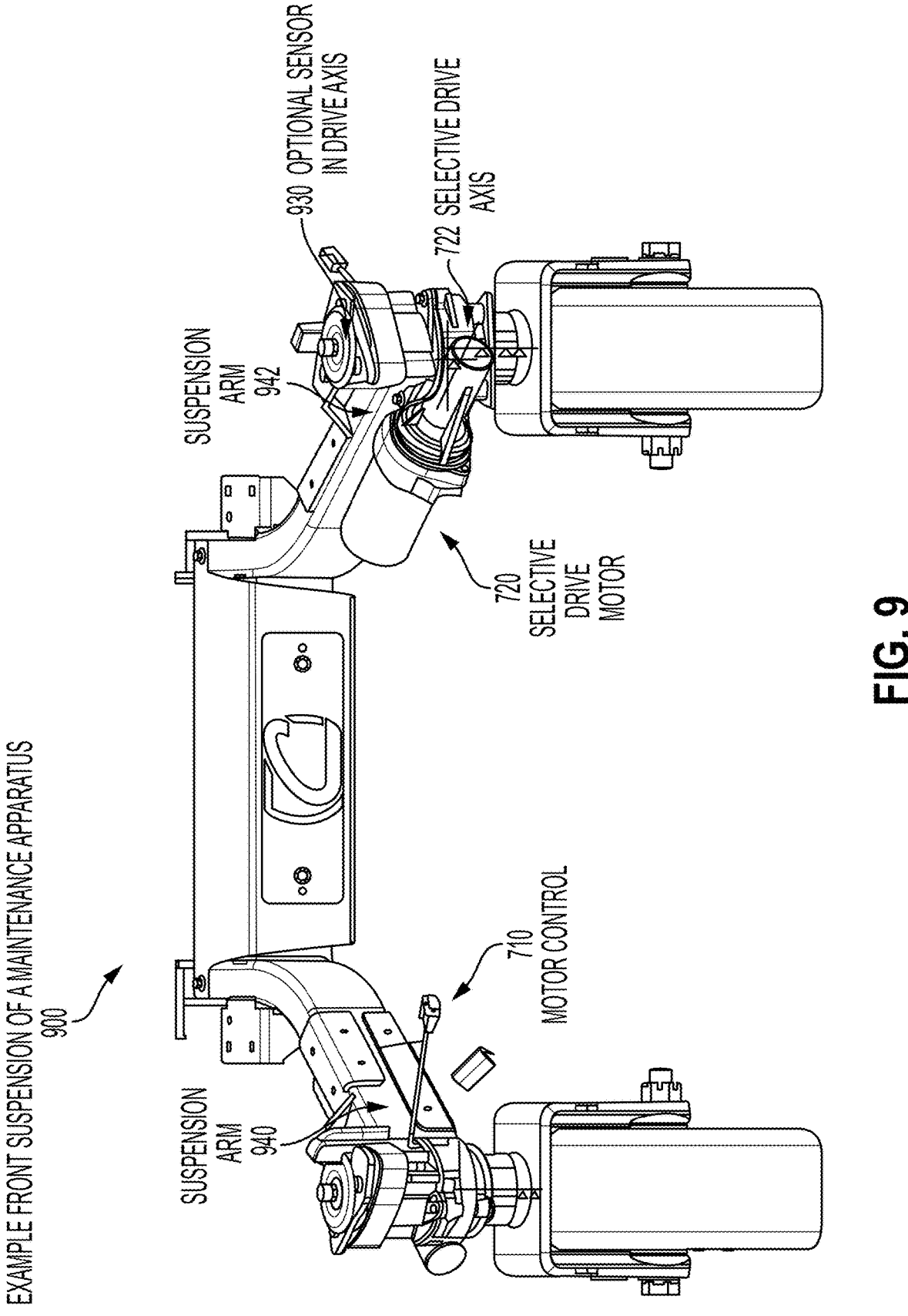
FIG. 9 illustrates a front perspective of a suspension of a lawn maintenance apparatus with caster wheel selective drive motors in further disclosed embodiments.

FIG. 9 depicts a diagram of an example front suspension 900 of a maintenance apparatus, in additional aspects of the disclosed embodiments. The maintenance apparatus can be a lawn maintenance device, such as a lawn mower, a riding lawn mowing device, a walk-behind lawn mowing device, a remote-controlled lawn mowing device, a partially or fully autonomous and automated lawn mowing device, or the like, or a suitable combination thereof. Front suspension 900 can comprise a first suspension arm 940 and a second suspension arm 942 (referred to collectively as suspension arms 940, 942). A selective drive motor 720 is attached to one side of the second suspension arm 942, and a like selective drive motor is attached to first suspension arm 940. The selective drive motors 720 can be configured to output a torque(s) upon respective selective drive axis 722 of suspension arms 940, 942 to effect rotation of caster wheels connected to suspension arms 940, 942. In various embodiments, a torque applied to the selective drive axis 722 of first suspension arm 940 by a first selective drive motor 720 can be selected to be the same or different magnitude (or direction) from a second torque applied to selective drive axis 722 of second suspension arm 942 by a second selective drive motor 720.

A direction and magnitude of the torque(s) upon the respective selective drive axis 722 can be determined in response to a measurement of torque or force upon the maintenance apparatus. The measurement of torque can be acquired at a PTO clutch or PTO anti-rotation pin of the maintenance apparatus, in an embodiment. The measurement of torque can be a difference in instantaneous torque output by different motors driving respective drive wheels of the maintenance apparatus, in another embodiment. The measurement of force can be a difference in instantaneous power consumption of different motors driving respective drive wheels of the maintenance apparatus, in yet another embodiment. The measurement of torque or force can be a torque or force upon a caster wheel(s) at selective drive axis 722 by an optional sensor in drive axis 930, in yet additional embodiments. In still other embodiments, another measurement of force known in the art or reasonably conveyed to one of ordinary skill in the art by way of the context provided herein, or any suitable combination of the foregoing can be provided.

Figure 9A:
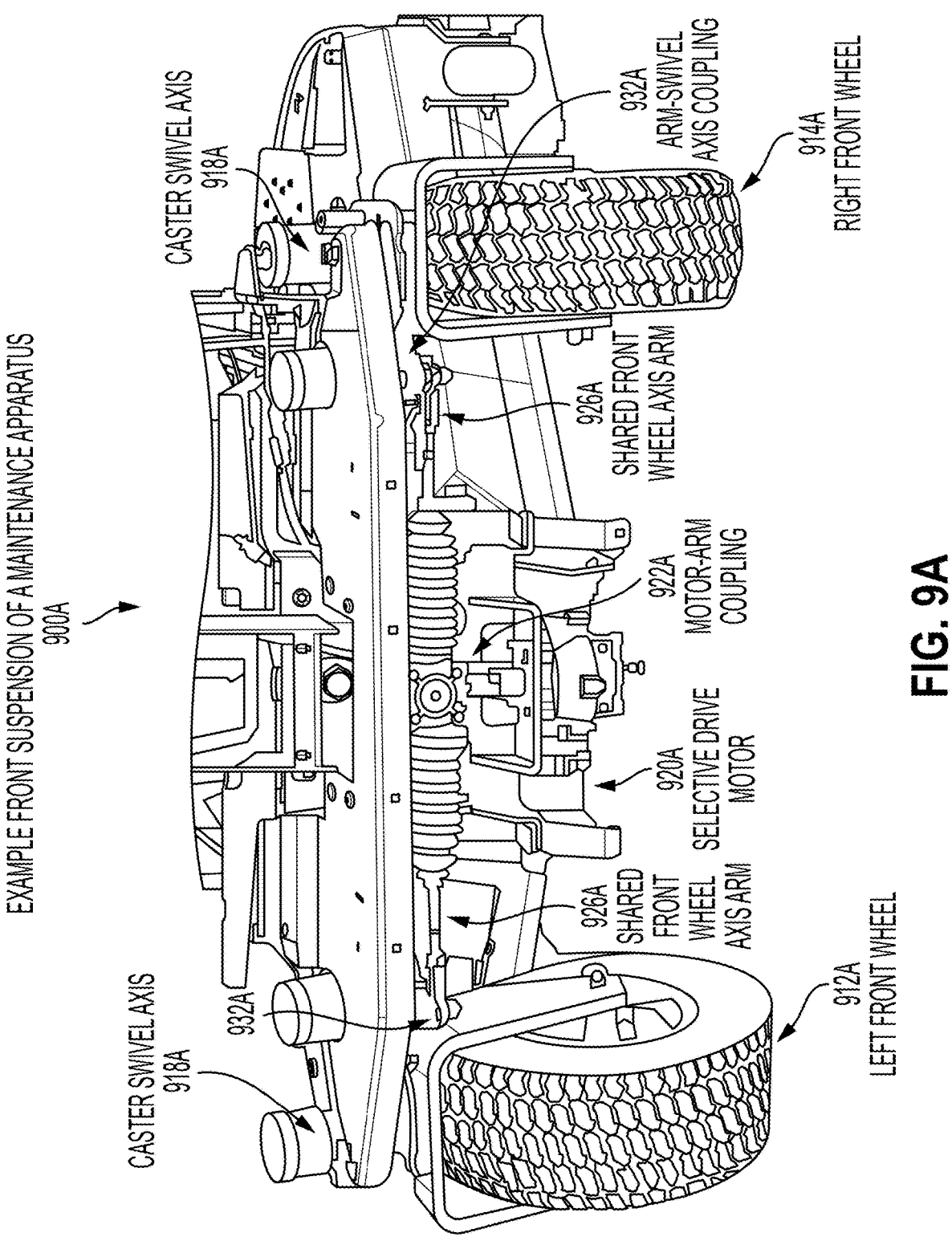
FIG. 9A depicts an instance of a front suspension of a disclosed maintenance apparatus in one or more embodiments of the present disclosure.

FIG. 9A illustrates an embodiment of a maintenance apparatus 900A with an example front suspension according to additional aspects of the present disclosure. Maintenance apparatus 900A comprises a (single) selective drive motor 920A secured to a front portion of maintenance apparatus 900A. A shared front wheel axis arm 926A provides steering control to a left front wheel 912A and right front wheel 914A in response to drive output from selective drive motor 920A, by way of a motor-arm coupling 922A. Shared front wheel axis arm 926A is mechanically coupled to caster swivel axis 918A of left front wheel 912A and right front wheel 914A by way of arm-swivel axis coupling 932A. Accordingly, in response to activation of selective drive motor 920A shared front wheel axis arm 926A is manipulated to rotate left front wheel 912A and right front wheel 914A about respective caster swivel axis 918A, to effect turning of front wheels 912A and 914A. Moreover, selective drive motor 920A can be responsive to a steering mechanism, such as controls 105 of FIG. 1, supra. In other aspects, the steering mechanism can be a remote control steering, a drive-by-wire steering control, or an automated (or partially automated) steering control module of an automated steering control device (which can be implemented at least in part utilizing a computer 1102 of FIG. 11, infra, or like computer-implemented steering module).

Figure 9B:
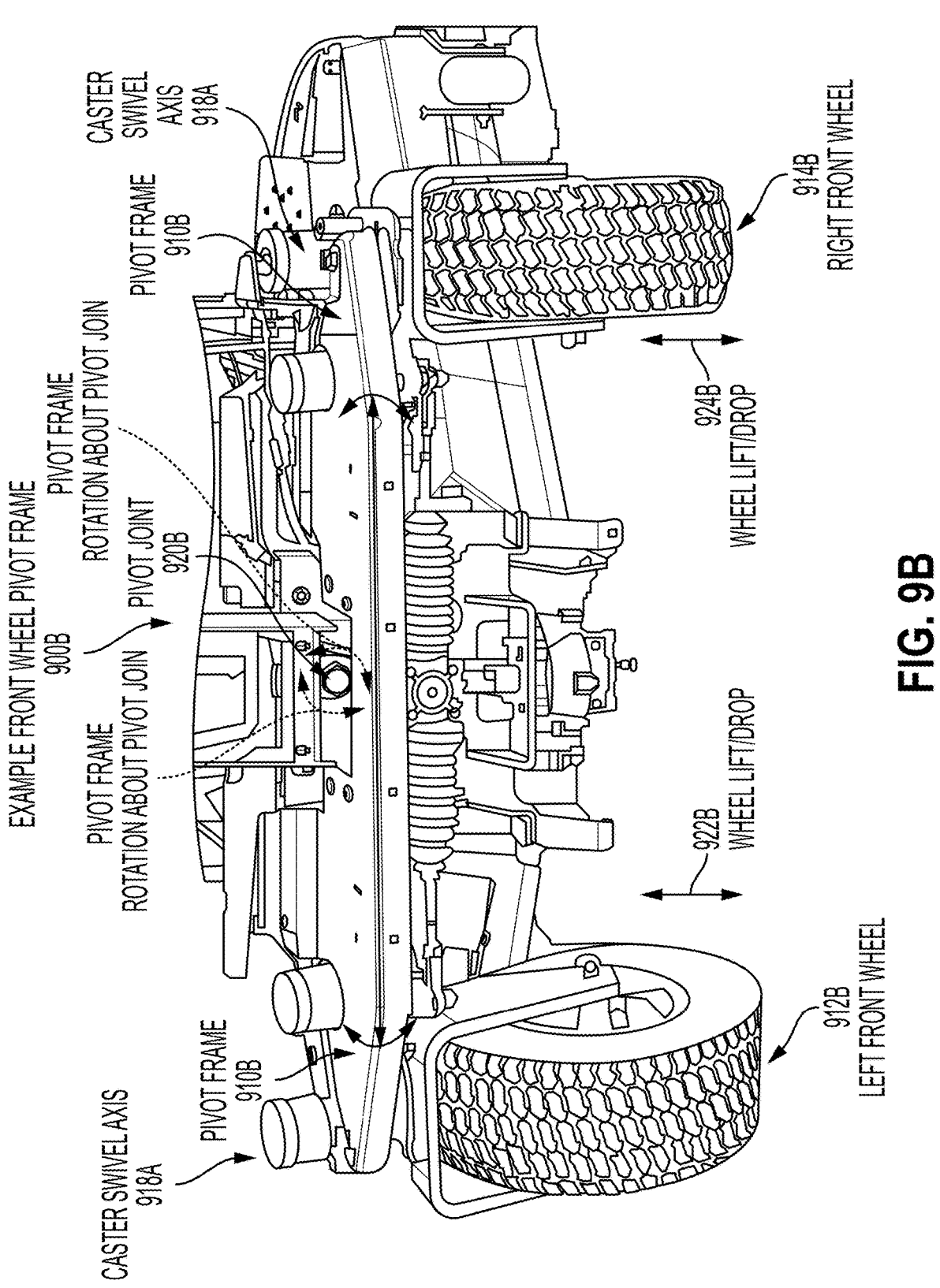
FIG. 9B illustrates an example front suspension of a disclosed maintenance apparatus according to additional embodiments.

FIG. 9B illustrates a further embodiment of an example front wheel pivot frame 900B for a maintenance apparatus according to additional embodiments of the present disclosure. Front wheel pivot frame 900B includes pivot frame 910B or pivot bar that provides a stable mechanical link between caster swivel axis 918A connected to left front wheel 912B and right front wheel 914B. Pivot frame 910B can be secured to the maintenance apparatus at least by a pivot joint 920B (though one or more other joints may secure pivot frame 910B to the maintenance apparatus in various embodiments). Pivot joint 920B permits rotation of pivot frame 910B relative to the maintenance apparatus about a rotation axis of pivot joint 920B. This allows left front wheel 912B and right front wheel 914B a degree of movement depicted by wheel lift/drop 922B (for left front wheel 912B) and wheel lift/drop 924B (for right front wheel 924B) in opposing relative directions. For example, as pivot frame 910B rotates counter-clockwise about pivot joint 920B—as depicted—right front wheel 914B lifts upward and left front wheel 912B drops downward. For clockwise rotation about pivot joint 920B, the reverse is true: right front wheel 914B drops downward and left front wheel 912B lifts upward. The relative up-down movement resulting from rotation of pivot frame 910B about pivot joint 920B can allow left front wheel 912B and right front wheel 914B some independence in tracking a surface upon which the maintenance apparatus is moving and maintaining ground contact (or increasing time of ground contact and decreasing time of non-contact) of left front wheel 912B and right front wheel 914B over uneven terrain. In various embodiments, pivot joint 920B can facilitate rotation of a few degrees to several degrees clockwise and counterclockwise about an axis of pivot joint 920B. In some embodiments, one or more bumpers (not depicted) can be mounted to a frame of the maintenance apparatus above or below respective ends of pivot frame 910B to (physically) halt rotation of pivot frame 910B further than the few to several degrees of clockwise or counterclockwise motion about pivot joint 920B. In an embodiment, the few to several degrees of clockwise and counter-clockwise rotation can be zero to five degrees, zero to seven degrees, zero to ten degrees, or the like, or any suitable value or range there between.

Figure 10:
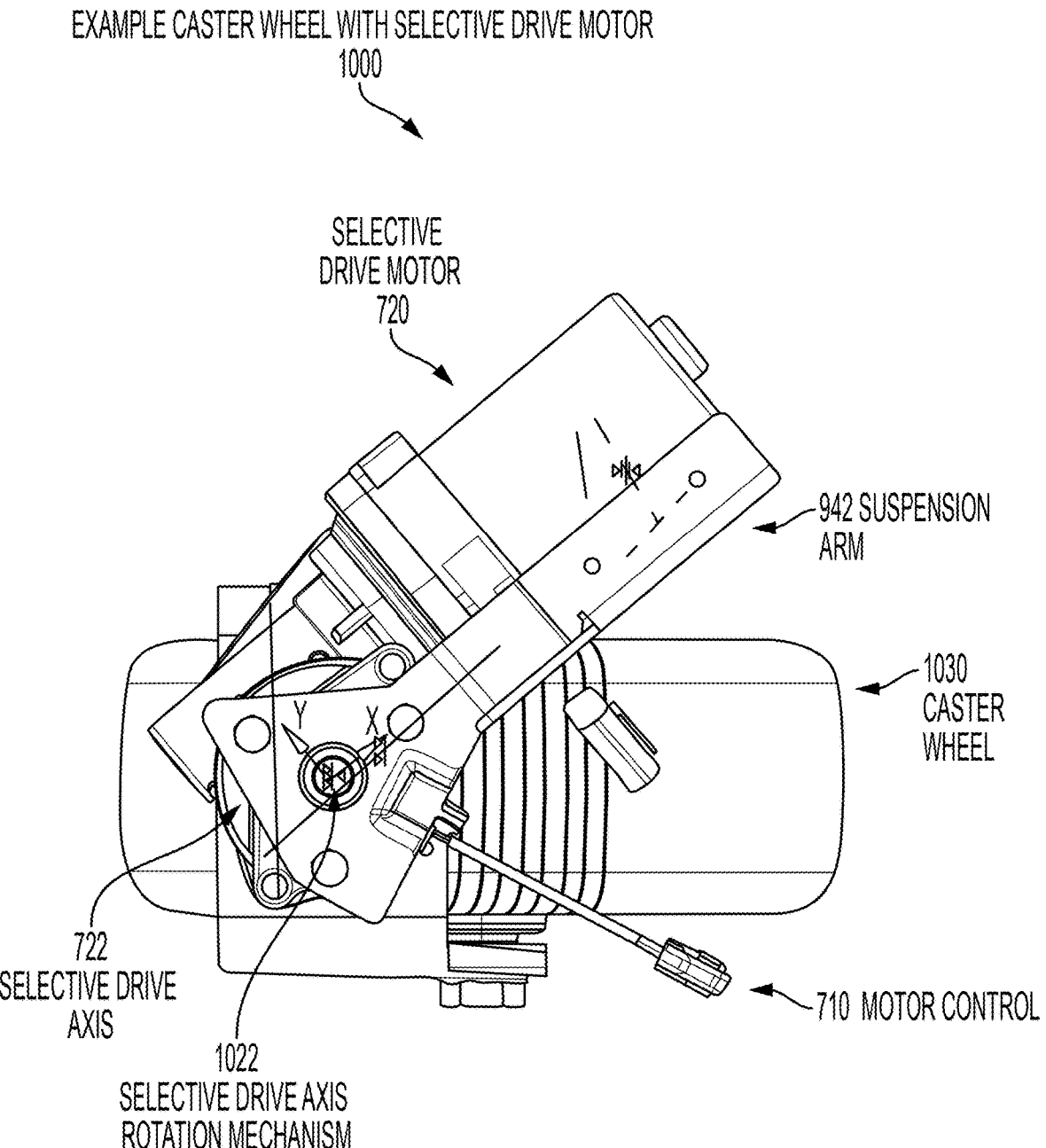
FIG. 10 depicts an overhead view of an example caster wheel with selective drive motor in further embodiments.

FIG. 10 depicts an example caster wheel with selective drive motor 1000 according to still further aspects of embodiments disclosed herein. FIG. 10 illustrates a portion of a suspension arm 942 of a maintenance apparatus from an overhead perspective, including caster wheel and selective drive motor 1000 and a selective drive motor 720 secured to the suspension arm 942. Selective drive motor 720 outputs a torque at a selective drive axis 722 in response to a signal from a motor control 710. Additionally, a caster wheel 1030 is mounted to the selective drive axis 722 and is configured to rotate about an axis of rotation of selective drive axis 722. In an aspect of the disclosed embodiment(s), caster wheel 1030 can rotate together with rotation of selective drive axis 722 itself. In another aspect, caster wheel 1030 rotates in part at a different rate from that of selective drive axis 722, or rotates about selective drive axis 722, which remains stationary. Also depicted is a selective drive axis rotational mechanism 1022 facilitating rotation of the caster wheel 1030, and optionally facilitating rotation of selective drive axis 722 as well. Selective drive axis rotation mechanism 1022 can be a lubricated pin, bearing, or other suitable mechanical mechanism facilitating rotation about an axis having negligible friction, in an embodiment. In other embodiments, selective drive axis rotation mechanism 1022 can be an electromechanical device facilitating the driving of rotation of caster wheel 1030 about selective drive axis 722, when selective drive motor 720 is activated, as well as allowing rotation of caster wheel 1030 about selective drive axis 722 in response to friction, gravity or other movement-related forces about selective drive axis 722 when selective drive motor 720 is deactivated. In some aspects of disclosed embodiments, selective drive axis 722 can have an axial friction that is non-negligible providing some resistance to rotation about selective drive axis 722 when selective drive motor 720 is deactivated.

Figure 11:
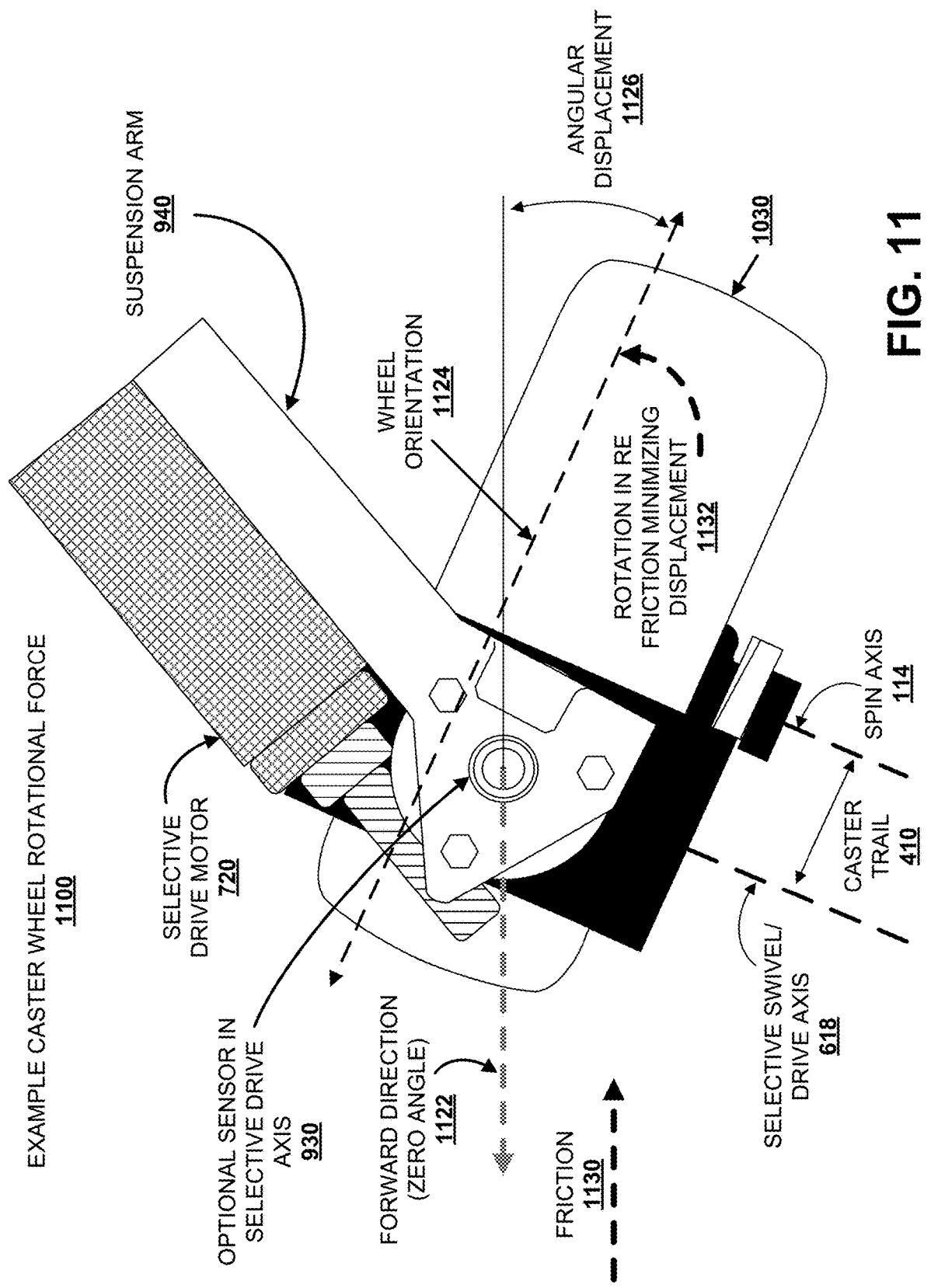
FIG. 11 illustrates a diagram of an example caster wheel with non-zero caster trail and displacement-minimizing friction force in further disclosed embodiments.

FIG. 11 depicts an example diagram of a rotational force 1100 upon a caster wheel 1030 according to various disclosed embodiments. The rotational force 1100 illustrated in FIG. 11 pertains to a force in response to movement of caster wheel 1030 in response to a force applied by suspension arm 940 upon caster wheel 1030, such as when a maintenance apparatus including suspension arm 940 is driven by a drive wheel(s), or other motive force. Additionally, the non-powered caster wheel rotational force 1100 ignores any force from selective drive motor 720, and thus can be operable when selective drive motor 720 is deactivated. When activated, selective drive motor 720 can provide an applied rotation force (not depicted) on a selective swivel/drive axis 618 mechanically coupled to caster wheel 1030 in addition to the rotational force 1100, or subtracting from the rotational force 1100 depending upon relative direction of the applied rotation force and rotational force 1100.

The example illustrated by FIG. 11 shows caster wheel 1030 having a wheel orientation 1124 as compared with a forward direction 1122 of a maintenance apparatus. Forward direction 1122 is defined by (and in a direction of) a force applied by suspension arm 940 on selective swivel/drive axis 618 and caster wheel 1030 and can also be referred to as a zero angle with respect to wheel orientation 1124 of caster wheel 1030. The force applied by suspension arm 940 causes motion and turning of caster wheel 1030 on a surface, which in turn results in a friction force 1130 having a component in a direction opposite the forward direction 1122. The friction force 1130 causes a rotation force 1132 in response to the friction force 1130, that is proportional to a length of a caster trail 410 of caster wheel 1030 and related to angular displacement 1126. This rotation force 1132 is in a direction that minimizes angular displacement 1126. With angular displacement 1126 as shown in FIG. 11, rotation force 1132 is in a counter-clockwise direction (looking at the page of FIG. 11). If instead angular displacement 1126 is above the line illustrated by forward direction 1122, rotation force 1132 will be in a clockwise direction (also minimizing angular displacement 1126).

Note that FIG. 11 does not illustrate an effect of axial friction of selective swivel/drive axis 618 on rotation force 1132. Where selective swivel/drive axis 618 is a suitably lubricated pin, bearing or other rotational coupling, the effect of the axial friction can be negligible and ignored. In other embodiments, for instance where selective swivel/ drive axis 618 is a mechanical or electro-mechanical powered axis, a significant axial friction can affect rotational forces at selective swivel/drive axis 618, including rotation force 1132 responding to friction 1130, an applied force provided by selective drive motor 720 upon selective swivel/ drive axis 618, a gravitational force on caster wheel 1030 and suspension arm 940, an inertial force(s) on suspension arm 940 and caster wheel 1030, and so forth. In one or more embodiments, the applied force provided by selective drive motor 720 can be configured to counteract, or to overcome, where suitable, rotation force 1132 on selective swivel/drive axis 618 in addition to other forces acting upon selective swivel/drive axis 618, such as the axial friction, gravitational force, and so forth. In other embodiments, selective drive motor 720 can be configured to apply a force proportional to a sensor measurement (e.g., an optional sensor 930 in selective swivel/drive axis 618, a sensor at a PTO clutch or PTO anti-rotation pin, a relative torque output at hydraulic motors of a maintenance apparatus, a relative power consumption at electric motors of a maintenance apparatus, and so forth) that is in part or in whole independent of rotation force 1132 and other forces upon selective swivel/drive axis 618, where suitable.

Figures 12A, 12B:
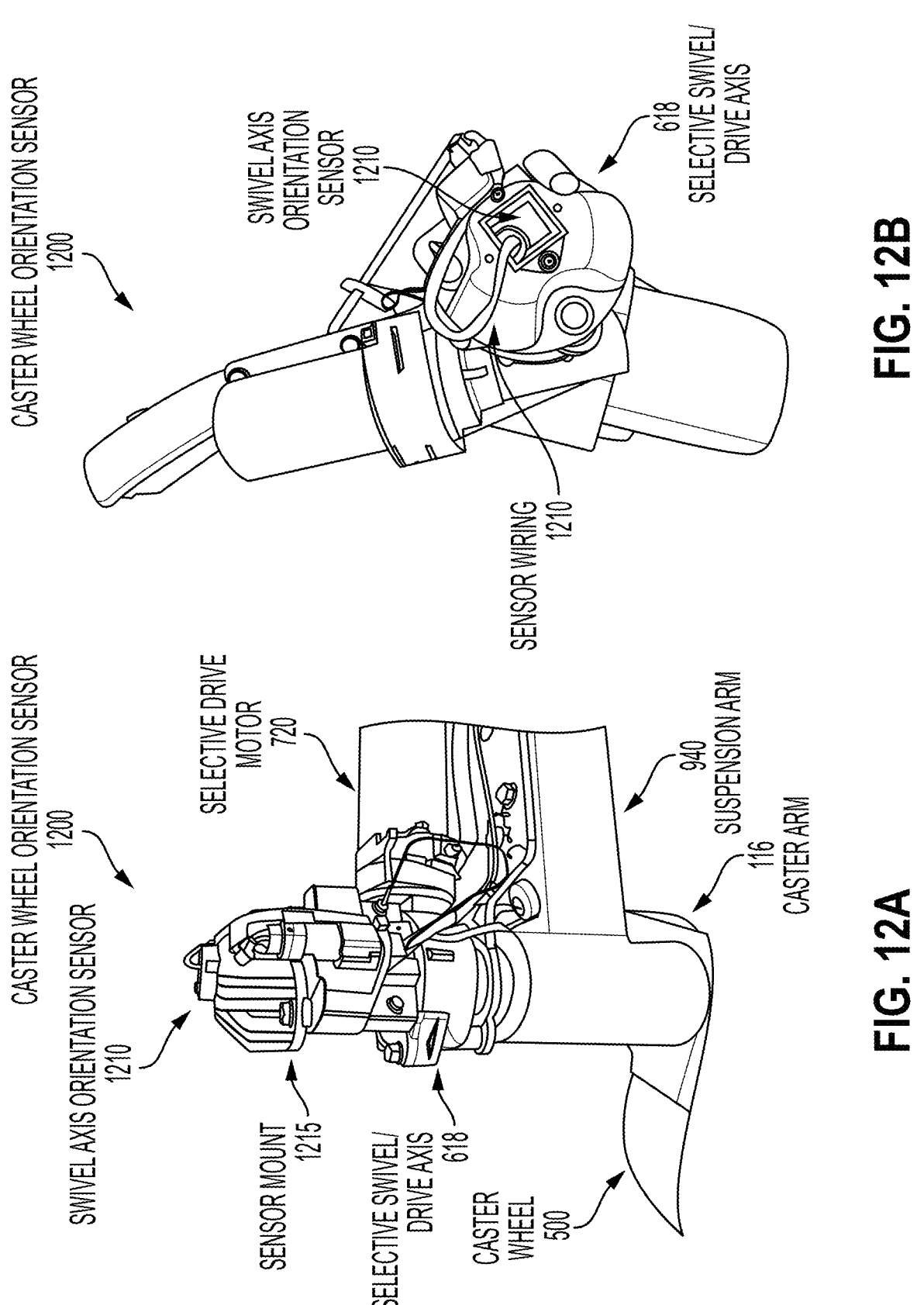

FIG. 12 illustrates embodiments of a caster wheel orientation sensor 1200 depicted in a side-view orientation in FIG. 12A and an overhead view orientation in FIG. 12B. Caster wheel orientation sensor 1200 is embodied, by the example illustrated in FIG. 12, with a swivel axis orientation sensor 1210 and a sensor mount 1215. It should be appreciated, however, that different shape, style, size and manner of mount 1215 can be utilized as suitable to secure swivel axis orientation sensor 1210 to selective swivel/drive axis 618 in a suitable position to achieve the function of detecting, measuring or monitoring rotational orientation of a caster arm 116 and caster wheel 500 of a disclosed maintenance apparatus. In the example illustrated by FIG. 12, caster wheel 500 and caster arm 116 can rotate within selective swivel/drive axis 618 by way of a swivel device (e.g., mounting rod 426 of FIG. 4, supra). Swivel axis orientation sensor can be configured to measure a rotational orientation of the swivel device in order to determine a rotational orientation of caster wheel 500. As one example, a hall effect sensor included within swivel axis orientation sensor 1210 can measure rotational position of a fixed magnet mounted to a top surface of the swivel device (e.g., mounting rod 426) to determine a rotational orientation of the swivel device. Sensor wiring 1210 can be provided to power swivel axis orientation sensor 1210, and to transfer data from swivel axis orientation sensor 1210 to a controller, described herein. Data specifying the rotational orientation of the swivel device can be transferred to the controller which can infer a rotational orientation of the caster wheel 500 there from. Accordingly, swivel axis orientation sensor 1210 can facilitate determination of current rotational orientation of caster wheel 500 and enable turning instructions to be generated to turn caster arm 116 by selective drive motor 720 to accomplish turning caster arm 116 from the current rotational orientation to a subsequent rotational orientation. This can facilitate steering a disclosed apparatus by way of caster arm 116 and caster wheel 500, in at least some disclosed embodiments, countering effects of torque or force upon the apparatus that affect orientation of caster arm 116 and caster wheel 500 in still other embodiments, or a combination of the foregoing in still further embodiments.

Generally, the illustrated embodiments are not provided as strict limitations on how the disclosed aspects can be practiced by one of ordinary skill in the art but are intended to be provided as examples that can be modified, interchanged, added to or subtracted from as would be suitable to one of ordinary skill in the art to accomplish the purposes and objectives described herein. As an example, an arrangement of components depicted in one embodiment can be swapped with components depicted in another embodiment, optionally excluding some components or including other components illustrated in a third embodiment, according to design creativity of one of ordinary skill in the art. For instance, optional sensor in drive axis 930 of FIG. 9 (or FIG. 11) can be arranged together with caster swivel axis 118 of FIG. 1 as an alternative to or in combination with optional sensor at PTO clutch/PTO anti-rotation pin 130, as suitable. As another example, swivel axis orientation sensor 1210 can be integrated into selective swivel/drive axis 618 underlying or overlying (in alternative aspects) the selective drive motor (e.g., 720 of FIG. 7) of the selective drive motor & axis 620 of FIG. 6, the combination of which can be integrated with caster swivel axis 118 of FIG. 1 to provide the functionality described in FIGS. 12A, 12B, 6 and 7 to the apparatus of FIG. 1. In yet a simpler example, caster wheel frame and axis 400 can replace caster wheel 112 of FIG. 1 or any other caster wheel of other drawings, in suitable alternatives of the present disclosure. As a further example, components of disclosed devices can be implemented as connected to other components rather than included within the parent device. For instance, selective drive axis 722 illustrated in FIG. 8 can include a mounting rod 426 of FIG. 4 below the selective drive axis 722 to which caster wheel 500 is coupled and enabled to rotate with little or no axial friction about mounting rod 426. Alternatively, the opposite orientation can be implemented within the scope of the disclosure: one component (e.g., motor control 710) depicted separate from another component (e.g., selective drive motor 720) can be aggregated as a single component in some embodiments (e.g., where motor control 710 is a wireless control interface capable of communicatively coupling motor control 710 with a controller wirelessly; where the controller is embedded within selective drive motor 720, and so forth). Additionally, it is noted that one or more disclosed processes can be combined into a single process providing aggregate functionality. Still further, components of disclosed machines/devices/sensors/control units can also interact with one or more other components not specifically described herein but known by those of skill in the art.

Figure 13:
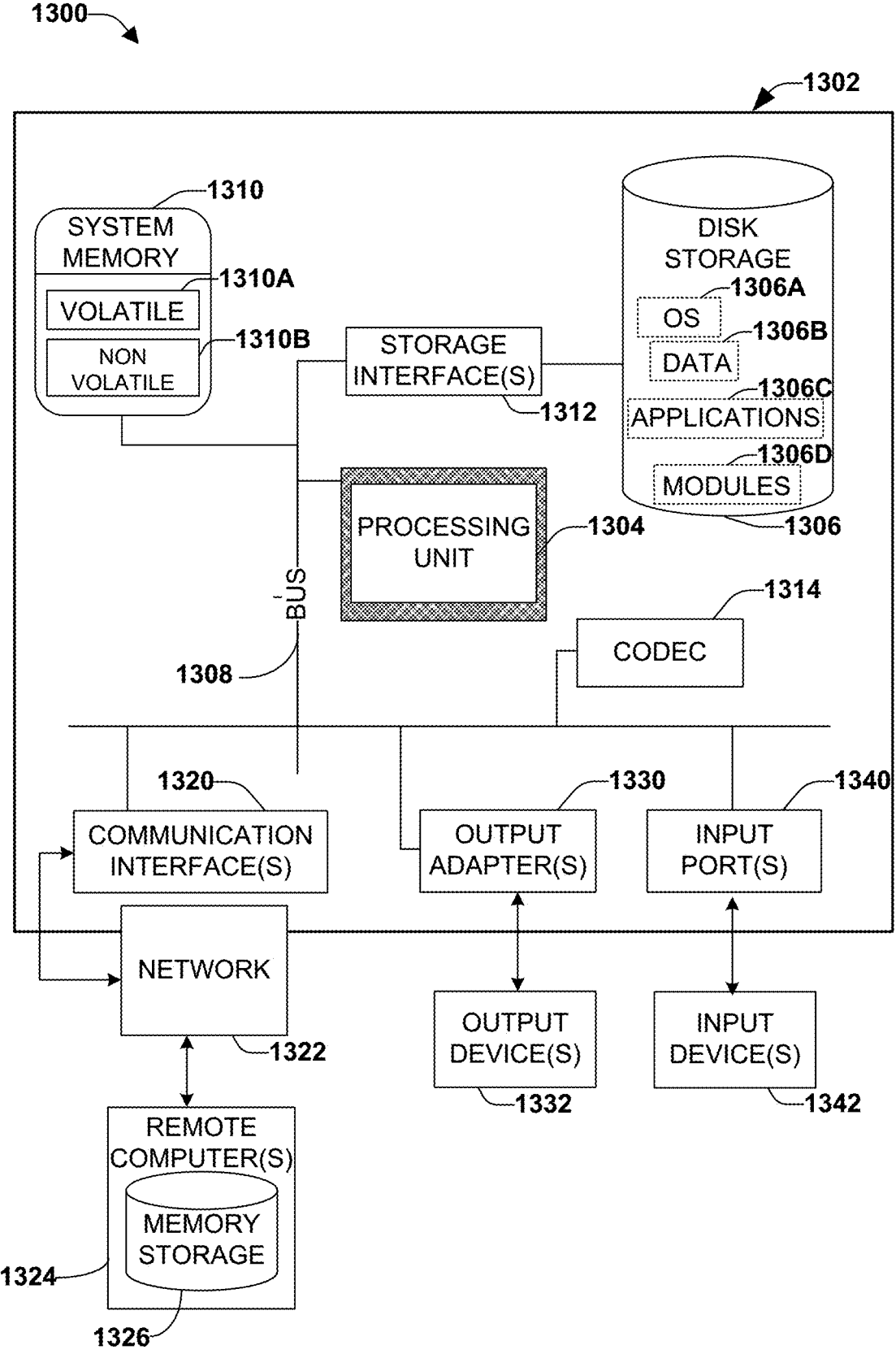
FIG. 13 depicts a diagram of an example electronic computing environment operable to implement one or more embodiments of the present disclosure.

In connection with FIG. 13, a disclosed controller can be embodied within hardware, such as a single integrated circuit (IC) chip, multiple ICs, an application specific integrated circuit (ASIC), or the like. A suitable operating environment 1300 for implementing various aspects of the claimed subject matter includes a computer 1302. Computer 1302 can embody a motor drive controller, in some embodiments, and can include only a subset of components identified herein as part of computer 1302 in some embodiments, whereas in other embodiments other components known to one of ordinary skill that are not depicted can nonetheless be included in computer 1302. In alternative or additional embodiments, a control unit of a maintenance apparatus (which can be separate from the above motor drive controller, or combined with such controller) can be embodied in part by computer 1302, or an analogous computing device known in the art, subsequently developed, or made known to one of ordinary skill in the art by way of the context provided herein.

The computer 1302 includes a processing unit 1304, a system memory 1310, a codec 1314, and a system bus 1308. The system bus 1308 couples system components including, but not limited to, the system memory 1310 to the processing unit 1304. The processing unit 1304 can be any of various available processors. Dual microprocessors and other multiprocessor architectures also can be employed as the processing unit 1304.

The system bus 1308 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1310 can include volatile memory 1310A, non-volatile memory 1310B, or both. Functions of a motor drive controller or apparatus control unit described in the present specification can be programmed to system memory 1310, in various embodiments. The basic input/output system (BIOS), containing the basic routines to transfer information between elements within the computer 1302, such as during start-up, is stored in non-volatile memory 1310B. In addition, according to present innovations, codec 1314 may include at least one of an encoder or decoder, wherein the at least one of an encoder or decoder may consist of hardware, software, or a combination of hardware and software. Although, codec 1314 is depicted as a separate component, codec 1314 may be contained within non-volatile memory 1310B. By way of illustration, and not limitation, non-volatile memory 1310B can include read only memory (ROM), programmable ROM (PROM), electrically programmable ROM (EPROM), electrically erasable programmable ROM (EEPROM), or Flash memory. Non-volatile memory 1310B can be embedded memory (e.g., physically integrated with computer 1302 or a mainboard thereof), or removable memory. Examples of suitable removable memory can include a secure digital (SD) card, a compact Flash (CF) card, a universal serial bus (USB) memory stick, or the like. Volatile memory 1310A includes random access memory (RAM), which can act as external cache memory, and can also employ one or more memory architectures known in the art, in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM), and so forth.

Computer 1302 may also include removable/non-removable, volatile/non-volatile computer storage medium. FIG. 13 illustrates, for example, disk storage 1306. Disk storage 1306 includes, but is not limited to, devices such as a magnetic disk drive, solid state disk (SSD) floppy disk drive, tape drive, Flash memory card, memory stick, or the like. In addition, disk storage 1306 can include storage medium separately or in combination with other storage medium including, but not limited to, an optical disk drive such as a compact disk ROM device (CD-ROM) or derivative technology (e.g., CD-R Drive, CD-RW Drive, DVD-ROM, and so forth). To facilitate connection of the disk storage 1306 to the system bus 1308, a removable or non-removable interface is typically used, such as interface 1312. In one or more embodiments, disk storage 1306 can be limited to solid state non-volatile storage memory, providing motion and vibration resistance for a motor controller, control unit or the like operable in conjunction with a power equipment machine (e.g., maintenance apparatus 100).

It is to be appreciated that FIG. 13 describes software that can program computer 1302 to operate as an intermediary between an operator of a maintenance apparatus (e.g., maintenance apparatus 100, 200, 300, etc.) or a component thereof (e.g., selective drive motor 720), operate as an intermediary between the maintenance apparatus or component and an autonomous control system for operating the maintenance apparatus/component embodied within operating environment 1300, in at least some embodiments. Such software can include an operating system 1306A. Operating system 1306A, which can be stored on disk storage 1306, acts to control and allocate resources of the computer 1302. Applications 1306C take advantage of the management of resources by operating system 1306A through program modules 1306D, and program data 1306B, such as a boot/shutdown transaction table and the like, stored either in system memory 1310 or on disk storage 1306. It is to be appreciated that the claimed subject matter can be implemented with various operating systems or combinations of operating systems.

Input device(s) 1342 connects to the processing unit 1304 and facilitates operator interaction with operating environment 1300 through the system bus 1308 via interface port(s) 1330. Input port(s) 1340 can include, for example, a serial port, a parallel port, a game port, a universal serial bus (USB), among others. Output device(s) 1332 can use some of the same type of ports as input device(s) 1342. Thus, for example, a USB port may be used to provide input to computer 1302 and to output information from computer 1302 to an output device 1332. Output adapter 1330 is provided to illustrate that there are some output devices, such as graphic display, speakers, and printers, among other output devices, which require special adapters. The output adapter 1330 can include, by way of illustration and not limitation, video and sound cards that provide a means of connection between the output device 1332 and the system bus 1308. It should be noted that other devices or systems of devices provide both input and output capabilities such as remote computer(s) 1324 and memory storage 1326.

Computer 1302 can operate in conjunction with one or more electronic devices described herein. For instance, computer 1202 can embody a control unit configured to receive and process data from optional sensor 130 and output a selected rotation force and direction to selective drive motor 720. Additionally, computer 1202 can be configured to select a force at selective drive motor 720 that counters a force measured at optional sensor 130 (or measured at another sensor, such as a differential torque output sensor, a differential power consumption sensor, and so forth), or select a force to drive caster arm 116 and wheel 112 to a target direction or angle in response to a steering input of an operator, remote control or (semi-) autonomous control unit, as described in embodiments throughout the disclosure. Computer 1202 can couple with optional sensor 130 (or other sensor(s)) or selective drive motor 720 by way of a network interface 1222 (e.g., wired or wireless) in an embodiment.

Communication connection(s) 1220 refers to the hardware/software employed to connect the network interface 1222 to the system bus 1208. While communication connection 1220 is shown for illustrative clarity inside computer 1202, it can also be external to computer 1202. The hardware/software necessary for connection to the network interface 1222 includes, for exemplary purposes only, internal and external technologies such as, modems including regular telephone grade modems, cable modems and DSL modems, ISDN adapters, and wired and wireless Ethernet cards, hubs, and routers.

In regard to the various functions performed by the above described components, machines, apparatuses, devices, processes, control operations and the like, the terms (including a reference to a "means") used to describe such components, etc., are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as mechanical structures, mechanical drives, electronic or electro-mechanical drive controllers, and electronic hardware configured to implement the functions, or a computer-readable medium having computer-executable instructions for performing the acts or events of the various processes or control operations described herein.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In other embodiments, combinations or sub-combinations of the above disclosed embodiments can be advantageously made. Moreover, embodiments described in a particular drawing or group of drawings should not be construed as being limited to those illustrations. Rather, any suitable combination or subset of elements from one drawing(s) can be applied to other embodiments in other drawings where suitable to one of ordinary skill in the art to accomplish objectives disclosed herein, objectives known in the art, or objectives and operation reasonably conveyed to one of ordinary skill in the art by way of the context provided in this specification. Where utilized, block diagrams of the disclosed embodiments or flow charts are grouped for ease of understanding. However, it should be understood that combinations of blocks, additions of new blocks, re-arrangement of blocks, and the like are contemplated in alternative embodiments of the present disclosure.

Based on the foregoing it should be understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A maintenance apparatus, comprising:
a frame;
a mow deck secured to the frame and comprising an implement;
a drive wheel secured to the frame rotatable about a drive wheel rotation axis;
a power source secured to the frame providing mechanical power to the drive wheel or to the implement of the mow deck;
a caster wheel secured to the frame by way of a caster arm, the caster arm having a spin axis securing the caster wheel to the caster arm and facilitating rotation of the caster wheel within the caster arm, and the caster arm having a swivel axis securing the caster arm to the frame facilitating rotation of the caster arm and caster wheel;
a motor having a selectively activated and deactivated motor drive with variable magnitude output connected to the swivel axis of the caster arm and configured to, when activated, apply a rotational force to the swivel axis;
a gauge for measuring a condition pertaining to the maintenance apparatus; and
a controller for receiving an output from the gauge indicative of whether the condition is satisfied and configured to activate the motor in response to the gauge indicating the condition is satisfied, wherein:
the swivel axis comprises a selective drive axis portion of the motor that has a rotational friction that causes frictional dampening of the rotation of the caster arm and caster wheel facilitated by the swivel axis; and
the rotational force applied by the motor has a minimum magnitude component selected to overcome the rotational friction of the selective drive axis portion.

2. The maintenance apparatus of claim 1, wherein the swivel axis facilitating rotation of the caster arm and the spin axis facilitating rotation of the caster wheel within the caster arm are separated by a non-zero distance defining a caster trail.

3. The maintenance apparatus of claim 2, wherein motion of the maintenance apparatus in a direction of motion in response to rotation of the drive wheel results in a rotational force on the caster wheel and the caster arm that minimizes angular displacement between a first direction defined by an orientation of the caster arm about the swivel axis and a second direction equal to the direction of motion.

4. The maintenance apparatus of claim 1, wherein the gauge is a torque gauge coupled to a component of the maintenance apparatus that receives a torque in response to the mechanical power provided to the drive wheel or to the implement, and wherein the torque gauge measures a magnitude of the torque.

5. The maintenance apparatus of claim 4, wherein:
the condition is a torque magnitude threshold; and
the controller causes the motor to apply the rotational force at the swivel axis of the caster wheel in response to the magnitude of the torque satisfying the torque magnitude threshold.

6. The maintenance apparatus of claim 5, wherein the controller causes the motor to terminate application of the rotational force at the swivel axis in response to a second magnitude of the torque that is below the torque magnitude threshold.

7. The maintenance apparatus of claim 5, wherein the controller causes the motor to terminate application of the rotational force at the swivel axis in response to a second magnitude of the torque that is below a second torque magnitude threshold, wherein the second torque magnitude threshold is smaller in magnitude than the torque magnitude threshold.

8. The maintenance apparatus of claim 4, wherein the controller causes the motor to apply the rotational force in proportion to the magnitude of the torque.

9. The maintenance apparatus of claim 4, wherein:
the component of the maintenance apparatus is a power take-off (PTO) clutch or a PTO anti-rotation pin;
the torque gauge measures the torque at the PTO clutch or PTO anti-rotation pin in response to the mechanical power provided to the implement of the mow deck; and
the motor applies a correction torque to the swivel axis of the caster arm opposing the magnitude of the torque measured by the torque gauge.

10. A maintenance apparatus, comprising:
a frame;
a mow deck secured to the frame and comprising an implement;
a drive wheel secured to the frame rotatable about a drive wheel rotation axis;
a power source secured to the frame providing mechanical power to the drive wheel or to the implement of the mow deck;
a caster wheel secured to the frame by way of a caster arm, the caster arm having a spin axis securing the caster wheel to the caster arm and facilitating rotation of the caster wheel within the caster arm, and the caster arm having a swivel axis securing the caster arm to the frame facilitating rotation of the caster arm and caster wheel;
a motor having a selectively activated and deactivated motor drive with variable magnitude output connected to the swivel axis of the caster arm and configured to, when activated, apply a rotational force to the swivel axis;
a gauge for measuring a condition pertaining to the maintenance apparatus; and
a controller for receiving an output from the gauge indicative of whether the condition is satisfied and configured to activate the motor in response to the gauge indicating the condition is satisfied, further comprising:
a second drive wheel secured to the frame and rotatable about the drive wheel rotation axis;
the power source comprises a first power source motor coupled to the drive wheel and a second power source motor coupled to the second drive wheel, wherein:
the gauge measures a difference in power output at the first power source motor and the second power source motor, and
the motor applies the rotational force to the swivel axis of the caster arm in proportion to the difference in power output in response to a signal from the controller resulting from the difference in power output satisfying the condition.

11. The maintenance apparatus of claim 10, wherein:
the first power source motor and second power source motor are hydraulic motors;
the gauge is a torque gauge; and
the difference in power output at the first power source motor and the second power source motor is a difference in torque output by the first power source motor and the second power source motor.

12. The maintenance apparatus of claim 10, wherein:
the first power source motor and the second power source motor are electric motors;
the gauge is an electric power measurement device; and
the difference in power output at the first power source motor and the second power source motor is a difference in electric power output by the first power source motor and the second power source motor.

13. A method for a maintenance apparatus that comprises a drive wheel, a caster wheel with a non-zero caster trail and connected to a selectively activatable motor, a power source and an implement, comprising:
obtaining a measurement of a force acting upon a component of the maintenance apparatus in response to driving and operating the implement of the maintenance apparatus;
comparing the measurement of the force to a condition stored at a power controller and determining whether the measurement of the force satisfies the condition;
converting the measurement of the force upon the component to a torque upon a caster wheel of the maintenance apparatus in response to determining the measurement of the force satisfies the condition, wherein the torque upon the caster wheel creates a rotational force upon the caster wheel; and
signaling the selectively activatable motor to apply the torque and the rotational force upon the caster wheel in response to determining the measurement of the force satisfies the condition.

14. The method of claim 13, wherein obtaining the measurement of the force upon the component further comprises measuring a torque magnitude at a power take-off (PTO) clutch or a PTO anti-rotation pin of the maintenance apparatus.

15. The method of claim 14, wherein converting the measurement of the force upon the component to the torque upon the caster wheel further comprises converting the torque magnitude to a proportional torque value upon the caster wheel selected to offset a directional force on the maintenance apparatus caused by the force upon the component.

16. The method of claim 13, wherein the maintenance apparatus further comprising a second drive wheel and a second power source, wherein the power source provides motive power to the drive wheel and the second power source provides second motive power to the second drive wheel.

17. The method of claim 16, wherein obtaining the measurement of the force upon the component further comprises measuring a torque differential between a first torque applied by the power source to the drive wheel and a second torque applied by the second power source to the second drive wheel.

18. The method of claim 16, wherein obtaining the measurement of the force upon the component further comprises measuring an electric power differential between a first electric power applied by the power source to the drive wheel and a second electric power applied by the second power source to the second drive wheel.

19. The method of claim 13, wherein the caster wheel rotates along a swivel axis that comprises a selective drive axis of the selectively activatable motor.

20. The method of claim 19, wherein the selective drive axis induces a rotational friction upon the rotation of the caster wheel along the swivel axis, and wherein converting the measurement of the force upon the component to the torque upon the caster wheel further comprises including within the torque upon the caster wheel a minimum rotational force to overcome the rotational friction of the selective drive axis.

21. The method of claim 20, wherein signaling the selectively activatable motor to apply the torque and the rotational force is in response to determining the gravitational tilt exceeds the threshold value.

22. The method of claim 20, wherein converting the measurement of the force upon the component to the torque upon the caster wheel further comprises estimating a rotation on the caster wheel in response to the transverse gravitational force and selecting the torque upon the caster wheel and the rotational force at least in part to counter the rotation on the caster wheel.

23. The method of claim 13, wherein the maintenance apparatus comprises a second caster wheel and a second selectively activatable motor, wherein signaling the selectively activatable motor further comprises signaling the second selectively activatable motor to apply the torque and the rotational force upon the second caster wheel.

24. The method of claim 13, wherein:

obtaining the measurement of the force acting upon the component of the maintenance apparatus further comprises measuring a gravitational tilt of the maintenance apparatus and determining a transverse gravitational force in a direction perpendicular to a direction of motion of the maintenance apparatus associated with driving the maintenance apparatus; and comparing the measurement of the force to the condition further comprises determining whether the gravitational tilt or the transverse gravitational force exceeds a threshold value.

25. The method of claim 13, wherein the maintenance apparatus further comprises an operator-controlled steering input that initiates steering control to the drive wheel, to the caster wheel or both, and wherein the signaling the selectively activatable motor to apply the torque and the rotational force upon the caster wheel is in addition to the steering control to the drive wheel, the caster wheel or both in response to the operator-controlled steering input.

26. The method of claim 13, wherein comparing the measurement of the force to the condition further comprises:

comparing the measurement of the force to a first threshold drive wheel power differential associated with drift from a straight line course;

comparing the measurement of the force to a second threshold drive wheel power differential associated with a low radius turn;

selecting, based on the comparing, a course correction algorithm stored at a memory of the maintenance apparatus for converting the force upon the component to the torque upon the caster wheel or selecting a low radius turn steering assist algorithm stored at the memory for converting the force upon the component to the torque upon the caster wheel;

determining a value of the torque from the measurement of the force based on one of: the course correction algorithm or the low radius turn algorithm; and signaling the selectively activatable motor to apply the torque and the rotational force according to one of: the course correction algorithm or the low radius turn algorithm.

27. The method of claim 13, wherein:

obtaining the measurement of the force acting upon the component further comprises measuring an operational torque upon the caster wheel in response to driving and operating the implement of the maintenance apparatus;

comparing the measurement of the force to the condition further comprises: determining whether the operational torque is greater than a minimum threshold and below an upper threshold;

converting the measurement of the force upon the caster wheel to the torque upon the caster wheel further comprises reversing a direction of the operational torque; and signaling the selectively activatable motor to apply the torque and the rotational force further comprises applying the reverse direction of the operational torque to oppose the operational torque in response to determining the operational torque is greater than the minimum threshold and below the upper threshold.

28. A vehicle, comprising:

a frame;

a drive wheel secured to the frame rotatable about a drive wheel rotation axis;

a power source secured to the frame providing mechanical power to the drive wheel;

a caster wheel secured to the frame by way of a caster arm, the caster arm having a spin axis securing the caster wheel to the caster arm and facilitating rotation of the caster wheel within the caster arm, and the caster arm having a swivel axis securing the caster arm to the frame facilitating rotation of the caster arm and caster wheel;

a motor having a selectively activated and deactivated motor drive with variable magnitude output connected to the swivel axis of the caster arm and configured to, when activated, apply a rotational force to the swivel axis;

a steering device for generating an orientation signal pertaining to an orientation of the vehicle;

a controller that receives the orientation signal from the steering device and is configured to determine a steering angle of the vehicle that corresponds to the orientation signal and to activate the motor and select the magnitude of the variable magnitude output to turn the caster arm according to the steering angle, and a gauge for measuring a condition affecting the vehicle, and wherein the controller selects the magnitude of the variable magnitude output further in response to the measurement of the condition satisfying a threshold value, wherein:

the controller is configured to deactivate the motor in response to a second measurement of the condition less than a second threshold value, that is lower in magnitude than the threshold value.

29. The vehicle of claim 28, wherein the steering device is an operator steering device that receives a steering input from an operator of the vehicle and outputs the orientation signal to the controller.

30. The vehicle of claim 29, wherein the steering device is an autonomous drive controller of the vehicle that utilizes position location data for the vehicle relative to a stored area map to generate and output the orientation signal to the controller.

31. The vehicle of claim 28, wherein the steering device is an operator control device that comprises a set of lap bars, a set of hand bars, a steering wheel, a jog-wheel, or a joystick.

32. The vehicle of claim 28, wherein the condition affecting the vehicle is a torque or a force affecting the vehicle and wherein the gauge is a torque measurement device or a force measurement device, respectively coupled to a component of the vehicle for measuring the torque or the force affecting the vehicle.

33. The vehicle of claim 32, further comprising a second drive wheel, and wherein the torque or the force is selected from a group consisting of: a torque at a power take-off (PTO) clutch of the vehicle, a torque at a PTO anti-rotation pin of the vehicle, a differential torque output of drive motors powering the drive wheel and the second drive wheel, a differential power consumption of drive motors powering the drive wheel and the second drive wheel, and a gravitational force upon the vehicle that is non-parallel to a direction of motion of the vehicle.

34. The vehicle of claim 32, wherein the controller is configured to select the magnitude of the variable magnitude output at least in part depending upon a measurement value of the torque or the force at the component of the vehicle measured by the torque measurement device or by the force measurement device.

35. The vehicle of claim 32, wherein the component of the vehicle is a power take-off (PTO) clutch, a PTO anti-rotation pin or an inertial measurement unit (IMU) configured to determine a roll orientation or a yaw orientation of the vehicle in response to the torque or force affecting the vehicle, wherein the controller selects the magnitude of the variable output to achieve a rotation of the caster wheel arm that combines the orientation signal with a compensation signal determined from the measured torque or force affecting the vehicle.

36. The vehicle of claim 28, wherein the controller is configured to deactivate the motor in response to a second measurement of the condition less than the threshold value.

37. The vehicle of claim 28, further comprising a pivot frame secured to the caster wheel and to the frame by a pivot joint, the pivot frame configured to rotate about the pivot joint to facilitate lifting or dropping the caster wheel relative to the frame of the vehicle in response to clockwise or counter-clockwise rotation of the pivot frame about the pivot joint, respectively.

\* \* \* \* \*